(12) United States Patent
Zhu et al.

(10) Patent No.: US 12,491,516 B2
(45) Date of Patent: Dec. 9, 2025

(54) NANOWELL ARRAY DEVICE FOR HIGH THROUGHPUT SAMPLE ANALYSIS

(71) Applicant: Battelle Memorial Institute, Richland, WA (US)

(72) Inventors: Ying Zhu, Richland, WA (US); Jongmin Woo, Richland, WA (US); Ljiljana Pasa-Tolic, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 969 days.

(21) Appl. No.: 17/673,407

(22) Filed: Feb. 16, 2022

(65) Prior Publication Data

US 2022/0258164 A1     Aug. 18, 2022

Related U.S. Application Data

(60) Provisional application No. 63/150,824, filed on Feb. 18, 2021.

(51) Int. Cl.
*B01L 3/00*     (2006.01)
*B01F 33/302*   (2022.01)
(Continued)

(52) U.S. Cl.
CPC ... *B01L 3/502792* (2013.01); *B01L 3/502707* (2013.01); *B01L 3/502753* (2013.01);
(Continued)

(58) Field of Classification Search
CPC ......... B01L 3/502792; B01L 3/502707; B01L 3/502753; B01L 3/50853; B01L 3/5088;
(Continued)

(56) References Cited

U.S. PATENT DOCUMENTS 11,123,732 B2     9/2021  Kelly et al.
2016/0096160 A1*  4/2016  Banyai .................. C12N 15/66
                                                                506/40
(Continued)

FOREIGN PATENT DOCUMENTS

WO   WO-0058735 A2 * 10/2000 .......... B01J 19/0046
WO   WO 2018/085835 A1   5/2018

OTHER PUBLICATIONS

Budnik et al., "SCoPE-MS: mass spectrometry of single mammalian cells quantifies proteome heterogeneity during cell differentiation," *Genome Biology*, 19:161, 12 pages, Oct. 22, 2018.
(Continued)

*Primary Examiner* — Jennifer Wecker
*Assistant Examiner* — Oyeleye Alexander Alabi
(74) *Attorney, Agent, or Firm* — Klarquist Sparkman, LLP

(57) ABSTRACT

A device for biological sample preparation and analysis is disclosed. The device includes a substrate and a plurality of spaced apart arrays disposed on an upper surface of the substrate. Each array includes a plurality of reaction vessels, each reaction vessel having a hydrophilic surface. A hydrophilic ring surrounds each array. Methods of making and using the device are also disclosed.

21 Claims, 21 Drawing Sheets
(5 of 21 Drawing Sheet(s) Filed in Color)

(51) Int. Cl.
| | |
|---|---|
| B01F 33/3033 | (2022.01) |
| B01L 7/00 | (2006.01) |
| B01L 9/00 | (2006.01) |
| B23D 63/00 | (2006.01) |
| B29C 37/00 | (2006.01) |
| B65G 47/80 | (2006.01) |
| B82Y 20/00 | (2011.01) |
| B82Y 30/00 | (2011.01) |
| B82Y 40/00 | (2011.01) |
| C07K 1/30 | (2006.01) |
| C12M 1/34 | (2006.01) |
| C12M 3/06 | (2006.01) |
| C12N 1/14 | (2006.01) |
| C12N 1/20 | (2006.01) |
| C12Q 1/02 | (2006.01) |
| C12Q 1/6806 | (2018.01) |
| C12Q 1/6844 | (2018.01) |
| C12Q 1/6848 | (2018.01) |
| C12Q 1/686 | (2018.01) |
| C23C 2/00 | (2006.01) |
| G01N 15/10 | (2024.01) |
| G01N 15/14 | (2024.01) |
| G01N 15/1433 | (2024.01) |
| G01N 21/29 | (2006.01) |
| G01N 21/41 | (2006.01) |
| G01N 21/45 | (2006.01) |
| G01N 21/65 | (2006.01) |
| G01N 30/12 | (2006.01) |
| G01N 33/543 | (2006.01) |
| G01N 33/574 | (2006.01) |
| G01N 33/58 | (2006.01) |
| G01N 33/68 | (2006.01) |
| G02B 6/42 | (2006.01) |
| G03F 7/039 | (2006.01) |
| G03F 7/11 | (2006.01) |
| G03F 7/32 | (2006.01) |
| G01N 30/02 | (2006.01) |
| G01N 30/54 | (2006.01) |
| G01N 30/88 | (2006.01) |

(52) U.S. Cl.
CPC ......... B01L 3/50853 (2013.01); B01L 3/5088 (2013.01); G01N 30/12 (2013.01); G01N 33/6851 (2013.01); G03F 7/0392 (2013.01); G03F 7/11 (2013.01); G03F 7/32 (2013.01); *B01L 2200/12* (2013.01); *B01L 2200/142* (2013.01); *B01L 2200/16* (2013.01); *B01L 2300/0819* (2013.01); *B01L 2300/0822* (2013.01); *B01L 2300/0887* (2013.01); *B01L 2300/165* (2013.01); *G01N 2030/027* (2013.01); *G01N 2030/126* (2013.01); *G01N 30/54* (2013.01); *G01N 30/88* (2013.01); *G01N 2030/8831* (2013.01); *G01N 2560/00* (2013.01)

(58) Field of Classification Search
CPC ........... B01L 2200/12; B01L 2200/142; B01L 2200/16; B01L 2300/0819; B01L 2300/0822; B01L 2300/0887; B01L 2300/165; B01L 2300/0829; B01L 2300/0893; B01L 3/5085; G01N 30/12; G01N 33/6851; G01N 30/54; G01N 30/88; G01N 2030/027; G01N 2030/126; G01N 2030/8831; G01N 2560/00; G03F 7/0392; G03F 7/11; G03F 7/32
See application file for complete search history.

(56) References Cited

U.S. PATENT DOCUMENTS

2017/0356829 A1   12/2017  Beebe et al.
2018/0299463 A1*  10/2018  Piehowski ......... G01N 33/6848

OTHER PUBLICATIONS

Dou et al., "High-throughput single cell proteomics enabled by multiplex isobaric labeling in a nanodroplet sample preparation platform," *Anal. Chem.*, vol. 91, pp. 13119-13127, Sep. 11, 2019.

Specht et al., "Single-cell proteomic and transcriptomic analysis of macrophage heterogeneity using SCoPE2," Genome Biology, 22:50, 27 pages, Jan. 27, 2021.

Tsai et al., "An improved boosting to amplify signal with isobaric labeling (iBASIL) strategy for precise quantitative single-cell proteomics," *Molecular & Cellular Proteomics*, vol. 19, pp. 828-838, May 1, 2020.

Zhu et al., "Nanodroplet processing platform for deep and quantitative proteome profiling of 10-100 mammalian cells," *Nature Communications*, vol. 9, 10 pages, Feb. 28, 2018.

International Search Report and Written Opinion issued for International Application No. PCT/US2022/016585 on May 25, 2022, 14 pages.

Ross et al., "Multiplexed protein quantitation in *Saccharomyces cerevisiae* using amine-reactive isobaric tagging reagents," *Molecular & Cellular Proteomics*, 3(12): 1154-1169, Sep. 22, 2004.

Rauniyar et al., "Isobaric labeling-based relative quantification in shotgun proteomics," *Journal of Proteome Research*, 13(12): 5293-5309, Nov. 4, 2014, published online Oct. 22, 2014.

* cited by examiner

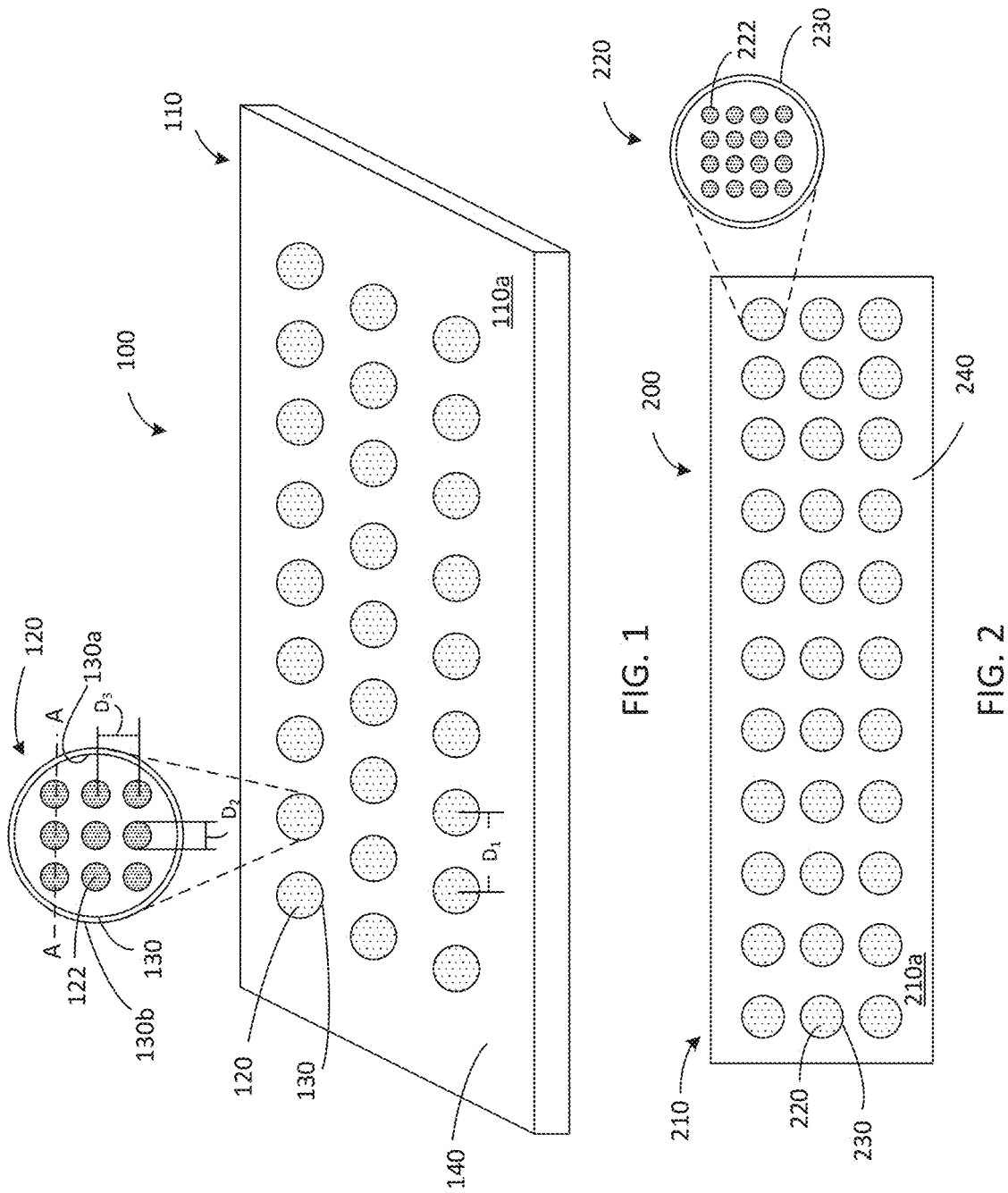

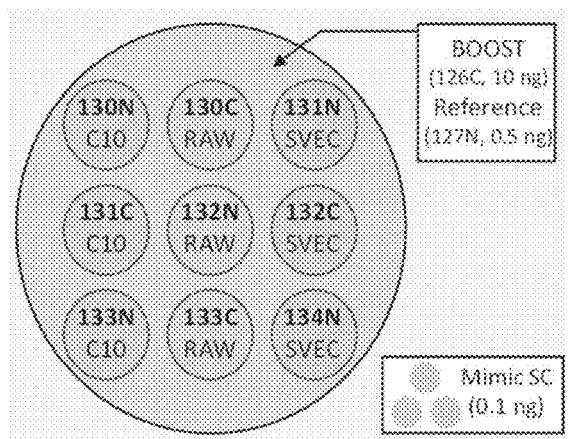
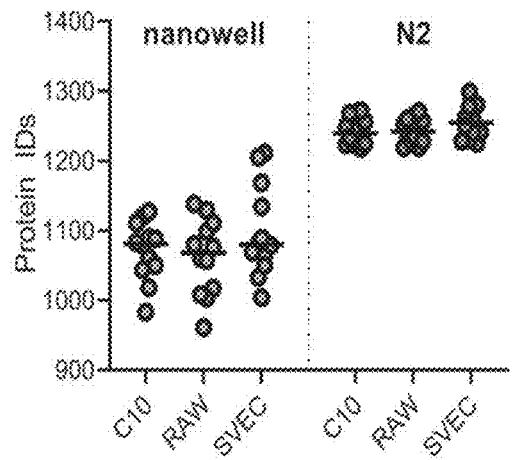
FIG. 11
FIG. 12
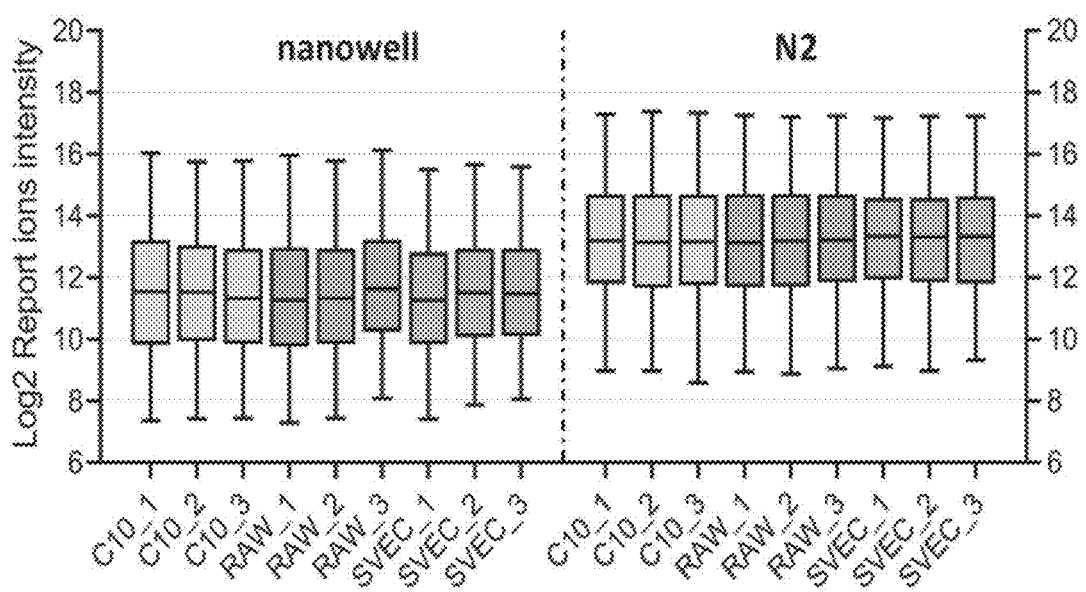
FIG. 13

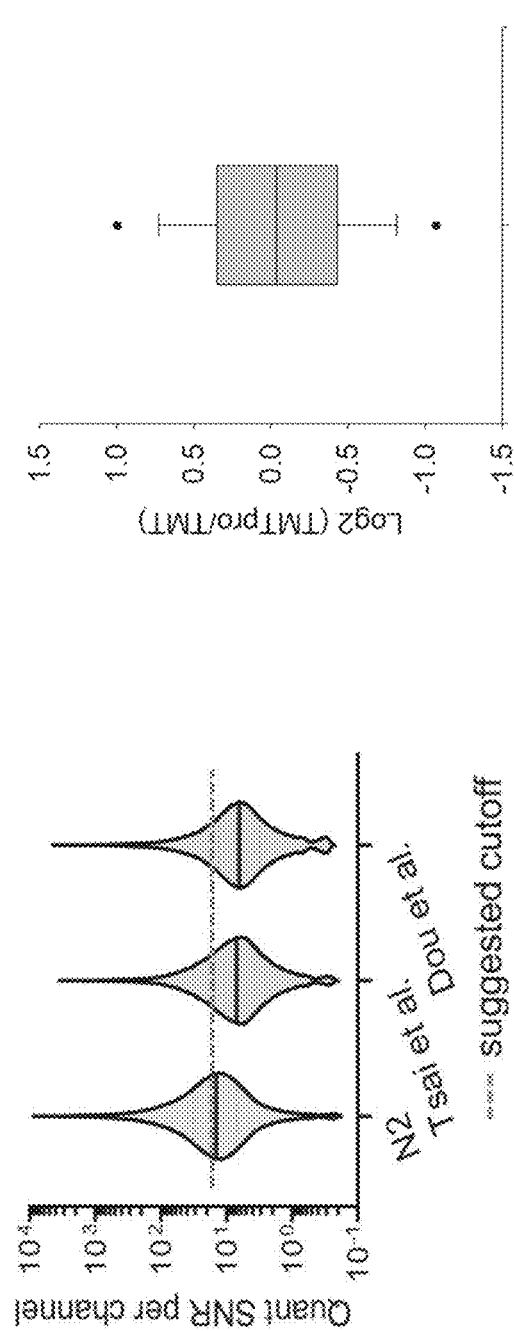
FIG. 17
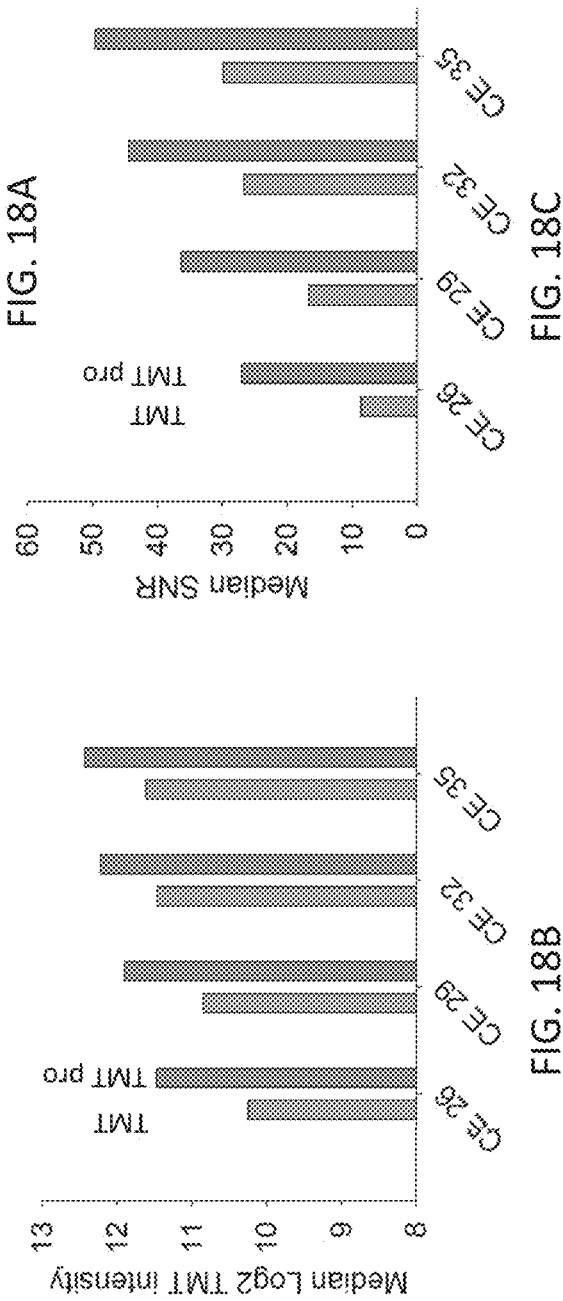
FIG. 18A
FIG. 18B
FIG. 18C

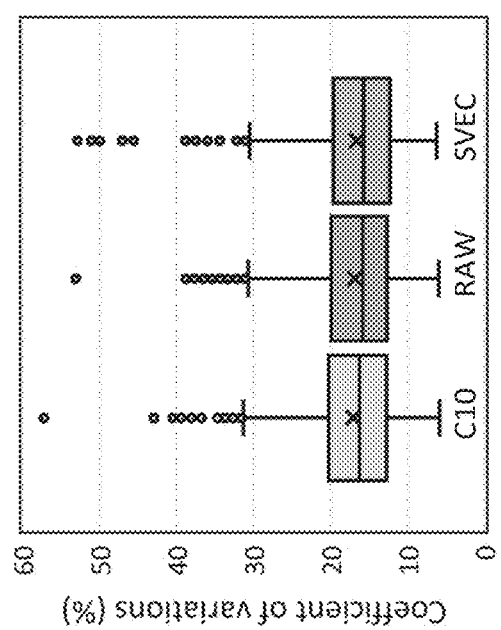
FIG. 20
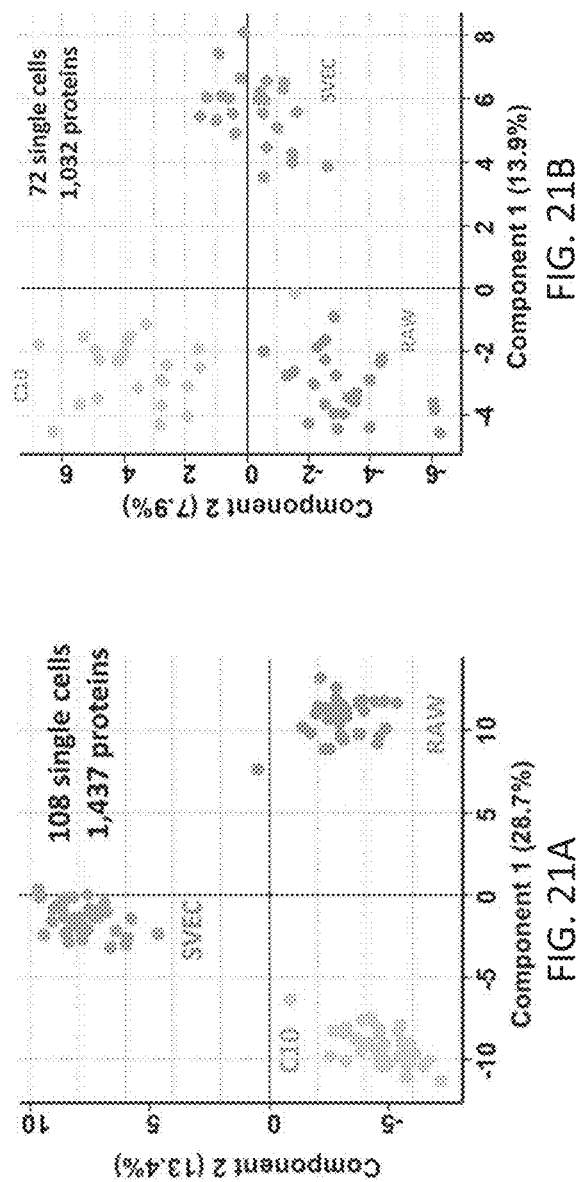
FIG. 21A
FIG. 21B

NANOWELL ARRAY DEVICE FOR HIGH THROUGHPUT SAMPLE ANALYSIS

CROSS REFERENCE TO RELATED APPLICATIONS

This application claims the benefit of the earlier priority date of U.S. Provisional Application No. 63/150,824, filed Feb. 18, 2021, which is incorporated by reference herein in its entirety.

ACKNOWLEDGMENT OF GOVERNMENT SUPPORT

This invention was made with Government support under Contract AC0576RL01830 awarded by the U.S. Department of Energy, as well as NIH Grant No. GM103493. The Government has certain rights in the invention.

FIELD

Embodiments of the disclosure relate generally to a device comprising one or more arrays of reaction vessels for high throughput sample preparation, and methods of using the device.

BACKGROUND

Human tissues are often highly heterogeneous, consisting of intermixed cellular populations and morphological substructures. Mass spectrometry (MS) based proteomic analysis can require samples comprising millions of cells to provide an in-depth profile or protein expression. This severely limits the analysis of small samples and the ability to resolve microheterogeneity within tissues. While MS sensitivity has improved, there is a need for devices and methods for reducing sample processing volumes to increase concentration and enhance biochemical sample measurements, as well as to increase sample throughput. There is also a need to improve high-throughput single-cell proteomic technologies.

SUMMARY

Embodiments of a device and method for processing small cellular and biochemical samples are disclosed.

Embodiments of the disclosed device comprise: a substrate having an upper surface; a plurality of spaced apart arrays disposed on the upper surface of the substrate, each array comprising a plurality of reaction vessels positioned on, or embedded within, the upper surface of the substrate, wherein each reaction vessel has a hydrophilic surface and a diameter of from greater than 0 mm to 0.8 mm; and a hydrophilic ring surrounding each array, wherein unoccupied regions of the upper surface of the substrate are hydrophobic.

In some embodiments of the device, each array on the upper surface of the substrate comprises from 3 to 100 reaction vessels configured in a grid pattern. In particular embodiments, (i) the plurality of arrays comprises from 2 to 100 spaced apart arrays or (ii) the plurality of arrays comprises at least one row of spaced apart arrays; or (iii) both (i) and (ii).

In some implementations, (i) each array is positioned on the upper surface of the substrate and each reaction vessel has an upper surface at a height of from 1 µm to 10 µm above the upper surface of the substrate; or (ii) each hydrophilic ring is positioned on the upper surface of the substrate and has an upper surface at a height of from 1 µm to 10 µm above the upper surface of the substrate; or (iii) both (i) and (ii).

In other implementations, (i) each array is embedded within the upper surface of the substrate and each reaction vessel has a volume no greater than 100 nL; or (ii) each hydrophilic ring is embedded within the upper surface of the substrate; or (iii) both (i) and (ii).

In any of the foregoing or following embodiments, the reaction vessels within each array may be spaced from 0.2 mm to 1.0 mm apart, center-to-center, from adjacent reaction vessels. In any of the foregoing or following embodiments, adjacent spaced apart arrays may have a center-to-center array spacing of from 2.5 mm to 20 mm.

In any of the foregoing or following embodiments, the substrate may comprise glass, polydimethylsiloxane (PDMS), polytetrafluoroethylene (PTFE), or polypropylene (PP). In any of the foregoing or following embodiments, the device may comprise a hydrophobic coating on the unoccupied regions. In some implementations, surfaces of the reaction vessels and hydrophilic rings comprise a passivation coating.

A method of making the disclosed device includes providing a substrate having an upper surface with a chromium layer and a photoresist material layer disposed on the upper surface; selectively removing portions of the photoresist material layer and the chromium layer to provide exposed regions and unexposed regions, wherein the unexposed regions define one or more arrays, each array comprising a plurality of reaction vessels, and a ring surrounding each array; treating the upper surface of the substrate with a hydrophobic reagent to form a hydrophobic coating on surfaces of the exposed regions; and forming the one or more arrays and the ring surrounding each array by removing remaining photoresist material layer and chromium layer from the unexposed regions to provide newly exposed regions of the upper surface of the substrate, the newly exposed regions defining the one or more arrays and the ring surrounding each array, wherein the newly exposed regions are hydrophilic. In some embodiments, the method further includes etching the exposed regions to remove a portion of the substrate in the exposed regions to a depth of up to 10 µm.

In an independent embodiment, a method of making the disclosed device includes providing a substrate having an upper surface with a chromium layer and a photoresist material layer disposed on the upper surface; selectively removing portions of the photoresist material layer and the chromium layer to provide exposed regions and unexposed regions; etching the exposed regions to remove a portion of the substrate in the exposed regions to provide etched exposed regions having a depth of up to 200 µm, wherein the etched exposed regions define one or more arrays, each array comprising a plurality of reaction vessels, and a ring surrounding each array; removing the removing photoresist material layer and the chromium layer from the unexposed regions; treating the upper surface of the substrate with a hydrophobic reagent to provide a hydrophobic coating on the upper surface; masking the upper surface such that the etched exposed regions remain unmasked; and removing the hydrophobic coating from the etched exposed regions.

Described herein are embodiments of a method for using the disclosed device. The method includes providing a device as disclosed herein, transferring a volume of a biological sample to a reaction vessel in an array of the device, wherein the volume of the biological sample in the reaction vessel is a non-zero amount ≤100 nL; processing the biological sample in the reaction vessel; adding a volume of a composition comprising one or more isobaric tags to the reaction vessel; dispensing an aqueous droplet with a volume from 1 µL to 20 µL onto the array, whereby the droplet, fluid contents of the reaction vessel, and any fluid contents of other reaction vessels in the array are combined to form a mixture; and collecting the mixture for subsequent analysis. In some embodiments, processing the biological sample comprises lysis, extraction, reduction, akylation, digestion, chemical labeling, acidification, or any combination thereof. In some implementations, the one or more isobaric tags comprises a selection of tandem mass tags.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 is a schematic diagram depicting a perspective view of an exemplary embodiment of the disclosed device comprising a plurality of arrays, each array including a plurality of reactor vessels, and a hydrophilic ring surrounding each array; $D_1$ is the center-to-center spacing of adjacent arrays, $D_2$ is the diameter of a reaction vessel within an array, and $D_3$ is the center-to-center spacing of adjacent reaction vessels.

FIG. 2 is a schematic diagram depicting a top plan view of another exemplary embodiment of the disclosed device.

FIG. 11 illustrates an experimental design for mimicking a single-cell sample (0.1 ng peptide) in an array of the disclosed device.

FIG. 12 is a graph showing the number of protein identifications from 0.1 ng tryptic peptides from three cell lines using a prior nanowell device and a device as disclosed herein (N2).

FIG. 13 is a graph showing the distributions of log 2 transformed protein intensities in each tandem mass tag (TMT) channel (n=870 proteins).

FIG. 17 is a violin plot showing the distributions of signal to noise ratio (SNR) per channel for raw single-cell signals generated by samples prepared using a device as disclosed herein (N2), as well as data generated from a prior nanowell chip (Tsai et al., *Mol Cell Proteomics* 2020, 19:828-838) and a similar liquid-chromatography-mass spectrometry set-up (Dou et al., *Anal Chem* 2019, 91:13119-13127).

FIGS. 18A-18C compare the signal intensities and signal-to-noise ratios (SNRs) between TMT 10plex™ and TMT-pro™ 16plex-labeled peptides (ThermoFisher Scientific, Waltham, MA). FIG. 18A shows the MS 1 signal difference between the two TMT reagents (n=7216 ratio values used to draw the box plot); centerline shows the median; box limits indicate the 25th and 75th percentiles; whiskers extend 1.5 times the interquartile range from the 25th and 75th percentiles. FIGS. 18B and 18C show the comparison of median log 2-transformed reporter ion intensities (18B) and median SNRs per channel at different normalized HCD collision energies (18C).

FIG. 20 shows the distribution of coefficients of variation for protein abundances in single cells among inter TMT batches with batch correction. Center lines show the medians; cross show the means; box limits indicate the 25th and 75th percentiles; whiskers extend 1.5 times the interquartile range from the 25th and 75th percentiles.

FIGS. 21A and 21B are principal component analysis (PCA) plots showing the clustering of single cells by cell types in cells prepared using the disclosed device (21A) and a prior nanowell device (21B).

Figure 3:
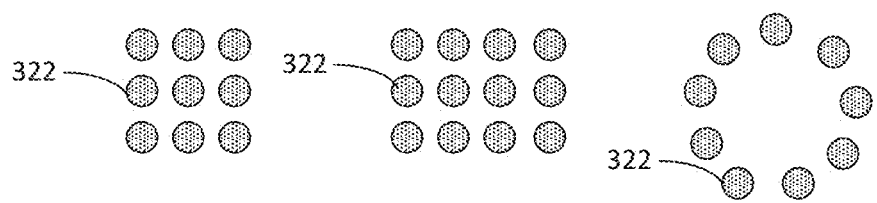
FIG. 3 is a schematic diagram showing several exemplary arrangements of reaction vessels in arrays of the disclosed device.

It is noted that the drawings are not to scale. The drawings are intended to depict only typical aspects of the subject matter disclosed herein, and therefore should not be considered as limiting the scope of the disclosure. Those skilled in the art will understand that the systems, devices, and methods specifically described herein and illustrated in the accompanying drawings are non-limiting exemplary embodiments and that the scope of the disclosed embodiments is defined solely by the claims.

DETAILED DESCRIPTION

One of the most dramatic technological advances in biological research has been the development of broad "omics-based" molecular profiling capabilities and their scaling to much smaller sample sizes than were previously feasible, including single cells. A major gap between demonstrated single-cell analytical sensitivity and the present practical need for orders of magnitude more starting material largely derives from limitations in required sample preparation, including sample isolation, cell lysis, protein extraction, proteolytic digestion, cleanup and delivery to the analytical platform. As sample sizes decrease without a concomitant reduction in reaction volume (often limited by evaporation and the microliter volumes addressable by pipet), the nonspecific adsorption of proteins and peptides to the surfaces of reactor vessels, along with inefficient digestion kinetics, can become increasingly problematic. Conventional pipetting, centrifuge tubes and microwell plates often limit reaction volumes to several μL or more, resulting in high surface loss and poor reaction kinetics for small samples. While progress has been made in enabling the proteomic analysis of trace samples, it is clear that further reducing sample requirements to biological samples containing low- or sub-nanogram amounts of protein while maintaining or increasing proteome coverage can enable many new applications.

The foregoing problems are solved with embodiments of the devices and methods disclosed herein. In particular aspects, the devices and methods of using the device described herein can lower processing volumes from conventional volumes to nanoliter volumes within a single reactor vessel, while minimizing losses, such as due to sample evaporation. In particular aspects, the biochemical quantification is improved by orders of magnitude due to pooling reactor contents in a single array.

Embodiments of the devices and methods described herein provide advantages over prior technologies used in processing cellular samples, which can require thousands of cells to provide in-depth proteome profiling. As described herein, some embodiments of the disclosure can significantly reduce the processing volumes and the number of cellular samples required, all while improving the efficiency of peptide quantification.

This disclosure concerns embodiments of a device comprising a plurality of arrays disposed on, or embedded within an upper surface of a substrate, each array comprising a plurality of reaction vessels. Embodiments of methods for making and using the device also are disclosed. The device may be referred to hereinafter as the "N2 chip." In some embodiments, the N2 chip is used for preparation and analysis of biological samples having nanoscale volumes.

Advantageously, sample preparation and analysis for small cell populations can be improved, for example by reducing the total processing volume to the nanoliter range within a single reactor vessel and by pooling the contents from a plurality of reaction vessels for sample analysis. In some embodiments, each sample volume may be no larger than 100 nL. Losses resulting from adsorptive losses and dilution are greatly reduced compared to conventional processes.

Embodiments of the device and method disclosed herein enable unique sample handling operations, including reagent addition and incubation, such that sample losses are minimized and much smaller samples become possible to analyze. Furthermore, the small sample sizes and reaction vessels enable the pooling of biological samples for analysis by ultrasensitive liquid chromatography-mass spectroscopy (LC-MS). In some implementations, when combined with analysis by LC-MS, biological samples prepared using the N2 chip facilitate profiling of greater than 1500 proteins from 100 cells.

The devices and methods disclosed herein find broad application in the fields of proteomics, metabolomics, and lipidomics as such robust analyses from small samples have not been achievable using previously developed procedures. Additionally, embodiments of the devices and methods disclosed herein provide sample processing efficiency for nanoscale biological samples (i.e., containing low- or sub-nanogram amounts of protein) to enable deep, quantitative proteome profiling for such applications. In some implementations, the device may be used in conjunction with a robotically controlled chip-based nanodroplet processing platform for dramatically enhancing proteomic sample processing and analysis for small cell populations.

I. Definitions and Abbreviations

The following explanations of terms and abbreviations are provided to better describe the present disclosure and to guide those of ordinary skill in the art in the practice of the present disclosure. As used herein, "comprising" means "Including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

Although there are alternatives for various components, parameters, operating conditions, etc. set forth herein, that does not mean that those alternatives are necessarily equivalent and/or perform equally well. Nor does it mean that the alternatives are listed in a preferred order unless stated otherwise.

Definitions of common terms in chemistry may be found in Richard J. Lewis, Sr. (ed.), *Hawley's Condensed Chemical Dictionary*, published by John Wiley & Sons, Inc., 2016 (ISBN 978-1-118-13515-0).

In order to facilitate review of the various embodiments of the disclosure, the following explanations of specific terms are provided:

Array: The term "array" includes its customary and ordinary meaning and refers to a number of elements arranged in rows and columns, such as a plurality of reaction vessels arranged in rows and columns.

Biological sample: As used herein, the term "biological sample" includes its customary and ordinary meaning and refers to a sample obtained from a biological subject, including a sample of biological tissue or fluid origin obtained in vivo or in vitro. Such samples can be, but are not limited to, body fluid (e.g., blood, blood plasma, serum, or urine), organs, tissues, fractions of organic matter, and cells isolated from mammals including, humans. Biological samples also may include sections of the biological sample including tissues (e.g., sectional portions of an organ or tissue). Biological samples may also include extracts from a biological sample, for example, an antigen from a biological fluid (e.g., blood or urine). A biological sample may be of prokaryotic origin or eukaryotic origin (e.g., insects, protozoa, birds, fish, or reptiles). In some embodiments, the biological sample can be mammalian (e.g., rat, mouse, cow, dog, donkey, guinea pig, or rabbit). In certain embodiments, the biological sample can be of primate origin (e.g., example, chimpanzee or human).

Hydrophilic surface or ring: The term "hydrophilic" includes its customary and ordinary meaning of having a tendency to mix with or be wetted by water. As used herein, the terms "hydrophilic surface" and "hydrophilic ring" refer to a surface or ring structure having a surface with a native hydrophilic property or a surface to which hydrophilic compounds are covalently or non-covalently attached. Exemplary native hydrophilic surfaces include, but are not limited to, glass and surfaces formed of a polymer that has hydrophilic properties.

Hydrophobic surface: The term "hydrophobic surface" includes its customary and ordinary meaning of a surface that repels water or is not wetted by water. As used herein, "hydrophobic surface" refers to a surface having a native hydrophobic property, or to a surface to which hydrophobic compounds are covalently or non-covalently attached.

LC-MS: The term "LC-MS" or "Liquid Chromatography-Mass Spectrometry" refers to a chemistry characterization technique in which mass spectrometry is performed on separated samples obtained from liquid chromatography, such as HPLC.

Passivation layer: As used herein, "passivation layer" includes its customary and ordinary meaning and refers to a coating that reduces chemical reactivity of the surface to which it is applied or reduces non-specific binding to the surface to which it is applied. For example, a passivation layer may reduce protein or other macromolecule binding to a surface.

Photoresist: The term "photoresist" includes its customary and ordinary meaning and refers to a group of light-sensitive materials used in photolithography to form a patterned surface coating.

Reaction vessel: As used herein, the term "reaction vessel" refers to a space or volume to which a sample and/or chemical reactants are confined. The reaction vessel may have a depth and define a volume. Or, the reaction vessel may comprise a hydrophilic surface to which an aqueous-based fluid or sample is attracted. The aqueous-based fluid or sample may form a droplet confined to the hydrophilic surface.

Substrate: The term "substrate" includes its customary and ordinary meaning. As used herein, the term "substrate" refers to a supporting surface or material on which a plurality of features, such as reaction vessels and arrays, are fabricated.

Tandem Mass Tag: The term "tandem mass tag" or "TMT" can include its customary and ordinary meaning and it can refer to a reagent that consists of an isobaric mass tag that when bonded to a tagged molecule, represents relative abundance of the molecule in a pooled nanodroplet.

II. Device and Method of Fabrication

Embodiments of the disclosed device, or N2 chip, comprise: a substrate having an upper surface; a plurality of spaced apart arrays disposed on the upper surface of the substrate, each array comprising a plurality of reaction vessels positioned on, or embedded within, the upper surface of the substrate, wherein each reaction vessel has a hydrophilic surface and a diameter of up to 0.8 mm; and a hydrophilic ring surrounding each array, the hydrophilic ring positioned on, or embedded within the upper surface of the substrate, wherein unoccupied regions of the upper surface of the substrate are hydrophobic.

FIG. 1 is a schematic diagram showing a perspective view of one exemplary, non-limiting embodiment of a device 100 as disclosed herein. As shown in FIG. 1, the device 100 comprises a substrate 110 having an upper surface 110a. The device 100 comprises plurality of spaced apart arrays 120 disposed on, or embedded within, the upper surface 110a of the substrate 110. As shown in the expanded portion of FIG. 1, the arrays 120 comprise a plurality of reaction vessels 122. While the reaction vessels 122 depicted in FIG. 1 are circular, it is understood that the cross-sectional geometry of the reaction vessels is not limited to a circular geometry. The reaction vessels could have any other desired cross-section geometry, such as an ellipse or a polygon (e.g., a square, hexagon, octagon, etc.) In the exemplary embodiment of FIG. 1, the reaction vessels 133 are arranged in a 3×3 grid. As discussed below, other arrangements are equally possible. The array 120 is surrounded by a hydrophilic ring 130, the hydrophilic ring 130 positioned on, or embedded within the upper surface 110a of the substrate 110. Advantageously, surfaces of the reaction vessels 122 also are hydrophilic. It is understood that, although the exemplary hydrophilic ring 130 of FIG. 1 has a circular shape, the hydrophilic ring can have any other shape as desired. For example, the hydrophilic "ring" could have a square, rectangular, or elliptical conformation, among others. In some embodiments, the hydrophilic ring 130 has a thickness, as measured between its inner edge 130a and its outer edge 130b, of from 0.05 mm to 5 mm, such as from 0.05 mm to 3 mm, 0.05 mm to 1 mm, 0.05 mm to 0.5 mm, or 0.05 mm to 0.25 mm. Unoccupied regions 140 (e.g., regions not occupied by reaction vessels and/or rings) of the substrate surface 110a are hydrophobic. In the embodiment of FIG. 1, the device 100 comprises 27 arrays 120 arranged in three rows, each row including nine arrays. Each array 120 comprises nine reaction vessels 122 arranged in a 3×3 square grid, providing a total of 243 reaction vessels on a single N2 chip.

FIG. 2 is a schematic diagram showing a top plan view of another exemplary, non-limiting embodiment of the device 200. In the embodiment shown in FIG. 2, the device 200 comprises a substrate 210 having an upper surface 210a. A plurality of spaced apart arrays 220 is disposed on, or embedded within, the upper surface 210a of the substrate 210. As shown in the expanded portion of FIG. 2, the arrays 220 comprise a plurality of reaction vessels 222. The array 220 is surrounded by a hydrophilic ring 230. Advantageously, surfaces of the reaction vessels 222 also are hydrophilic. Unoccupied regions 240 (e.g., regions not occupied by reaction vessels and/or rings) of the substrate surface 210a are hydrophobic. The device 200 of FIG. 2 comprises 33 arrays arranged in three rows, each row including 11 arrays. Each array 220 comprises 16 reactions vessels 222 arranged in a 4×4 square grid, providing a total of 528 reaction vessels on a single N2 chip.

Advantageously, the reaction vessels 122, 222 retain biological samples and volumes of reagents dispensed into the reaction vessel 122, 222 or onto the biological sample for further processing. In some implementations, the device 100, 200 is configured to provide submicron positioning accuracy and capacity for accurately handling picoliter volumes to dispense cells and reagents into reaction vessels 122, 222 of the device 100, 200 for further processing (e.g., to yield a processed sample). and to retrieve samples for subsequent analysis.

A person of ordinary skill in the art, however, will understand that embodiments of the N2 chip may include fewer or more arrays 120, 220 than those shown in the exemplary embodiments of FIGS. 1 and 2. Additionally, each array independently may include fewer or more reaction vessels 122, 222 than shown in FIGS. 1 and 2. In any of the foregoing or following embodiments, the device may comprise from 2 to 100 spaced apart arrays, such as from 4 to 80 spaced apart arrays, from 5 to 75 spaced apart arrays, from 10 to 50 spaced apart arrays, or from 20 to 40 spaced apart arrays. In some embodiments, e.g., as shown in FIGS. 1 and 2, the arrays 120, 220 are arranged in one or more rows of spaced apart arrays. In some embodiments, the rows include 4-25 arrays, such as 4-20 arrays, 5-20 arrays, 5-15 arrays, or 7-12 arrays. In certain implementations, the spacing between adjacent arrays is consistent, or the same, to facilitate use of the device with automated platforms. In any of the foregoing or following embodiments, with reference to FIG. 1, adjacent spaced apart arrays have a center-to-center array spacing $D_1$ of from 2.5 mm to 20 mm. In some embodiments, the center-to-center array spacing $D_1$ is from 2.5 mm to 10 mm, 2.5 mm to 5 mm, or 3 mm to 5 mm. The person of ordinary skill in the art will understand that, the center-to-center array spacing $D_1$ may increase as the number of reaction vessels in the array increases and may depend, at least in part, on the arrangement of the reaction vessels within the array.

In any of the foregoing or following embodiments, each array of the device independently may comprise from 3 to 100 reaction vessels 122, 222, such as from 4 to 100 reaction vessels, from 9 to 100 reaction vessels, from 9 to 85 reaction vessels, from 9 to 65 reaction vessels, from 9 to 50 reaction vessels, from 9 to 40 reaction vessels, from 9 to 25 reaction vessels, or from 9 to 20 reaction vessels. In some embodiments, the reaction vessels are arranged in a regular pattern. For example, as shown in FIG. 3, a plurality of reaction vessels 322 may be arranged in a square grid, a rectangular grid, or a circle. Although not shown, it is understood that the circle arrangement of FIG. 3 may further include additional reaction vessels within the interior portion of the circle. Other arrangements (not shown) are also possible, e.g., a hexagonal arrangement, an octagonal arrangement, an elliptical arrangement and the like. In one embodiment, each array in the plurality of arrays comprises the same number of reaction vessels, wherein the reaction vessels are configured in the same arrangement in each array. For example, each array may include 9 reaction vessels in a 3×3 square grid, 16 reaction vessels in a 4×4 grid, or 25 reaction vessels in a 5×5 grid. In an independent embodiment, the arrays on the N2 chip include varying numbers of reaction vessels and/or the reaction vessels are configured in different arrangements in one or more of the arrays. For example, some arrays may include 9 reaction vessels in a 3×3 grid while other arrays on the same N2 chip may include 16 reaction vessels in a 4×4 grid. In any of the foregoing or following embodiments, with reference to the expanded portion of FIG. 1, each reaction vessel 122 may have a diameter $D_2$ of from greater than 0 mm to 0.8 mm. Advantageously, the diameter $D_2$ is greater than a diameter of a single prokaryotic or eukaryotic cell. In some embodiments, each reaction vessel 122 has a diameter $D_2$ greater than 0 mm to 0.8 mm, such as greater than 0 mm to 0.6 mm, greater than 0 mm to 0.5 mm, from 0.1 mm to 0.8 mm, 0.2 mm to 0.8 mm, from 0.2 mm to 0.7 mm, or from 0.2 mm to 0.6 mm. In some embodiments, each reaction vessel 122 in a particular array 120 has the same diameter as every other reaction vessel in the array.

With from 2 to 100 spaced apart arrays, the arrays comprising from 3 to 100 reaction vessels, a single N2 chip may include from 6 to 10,000 reaction vessels, providing unprecedented capability for sample analysis and throughput. In some embodiments, the N2 chip comprises 50-7500 reaction vessels, 75-5000 reaction vessels, 100-2500 reaction vessels, 150-1500 reaction vessels, 200-1000 reaction vessels, or 225-750 reaction vessels. In certain working embodiments, the N2 chip comprises 243 or 528 reaction vessels.

Figure 4:
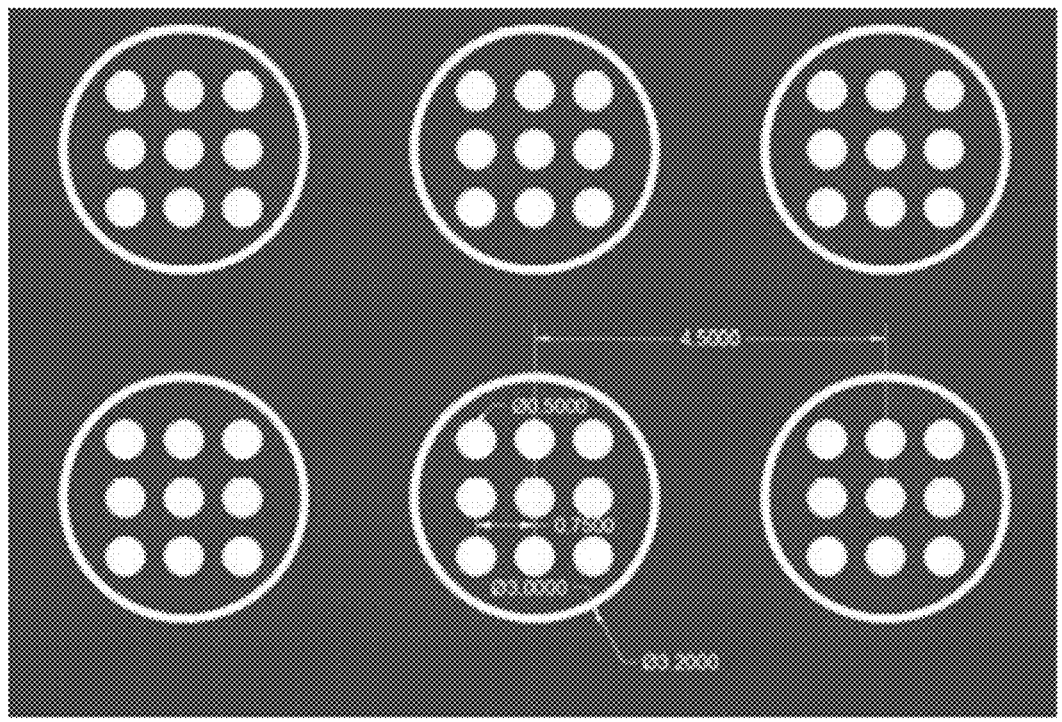
FIG. 4 is a schematic diagram depicting a top plan view of an exemplary embodiment of the device illustrating exemplary dimensions and spacings of reaction vessels, arrays, and hydrophilic rings of the device.

Advantageously, individual reaction vessels 122, 222 are spatially isolated from other reaction vessels, allowing small volumes of samples and/or reagents to be confined to a single reaction vessel. With reference to the expanded portion of FIG. 1, a center-to-center spacing D between adjacent reaction vessels is greater than a diameter of the reaction vessels. In any of the foregoing or following embodiments, the center-to-center spacing of the reaction vessels $D_3$ may be from 0.2 mm to 2.0 mm apart, such as from 0.2 mm to 1 mm, 0.3 mm to 0.9 mm, from 0.4 mm to 0.8 mm, or from 0.5 mm to 0.8 mm. FIG. 4 shows one exemplary embodiment of a plurality of arrays, each array having nine reaction vessels arranged in a 3×3 grid. In the exemplary embodiment of FIG. 4, each reaction vessel has a diameter of 0.5 mm (e.g., $D_2$ of FIG. 1). The center-to-center spacing between adjacent reaction vessels is 0.75 mm (e.g., $D_3$ of FIG. 1). A hydrophilic ring surrounds each array, the hydrophilic ring having an inner diameter of 3.0 mm and a thickness of 0.1 mm, providing an outer diameter of 3.2 mm. The center-to-center spacing between adjacent arrays is 4.5 mm (e.g., $D_1$ of FIG. 1).

Figure 5A:
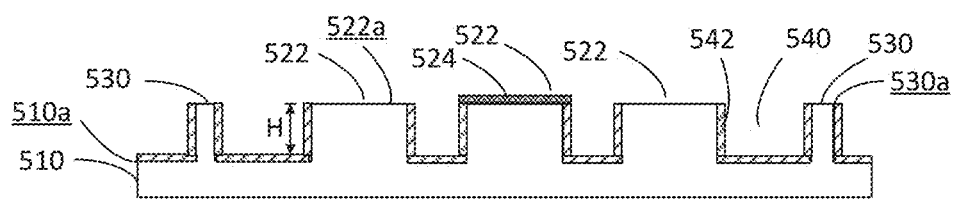
FIGS. 5A and 5B are cross-sectional schematic diagrams showing reaction vessels and a hydrophilic ring disposed on the upper surface of the substrate (5A) or embedded within the upper surface of the substrate (5B); H is the height of a reaction vessel (5A) and d is the depth of a reaction vessel (5B).
Figure 5B:
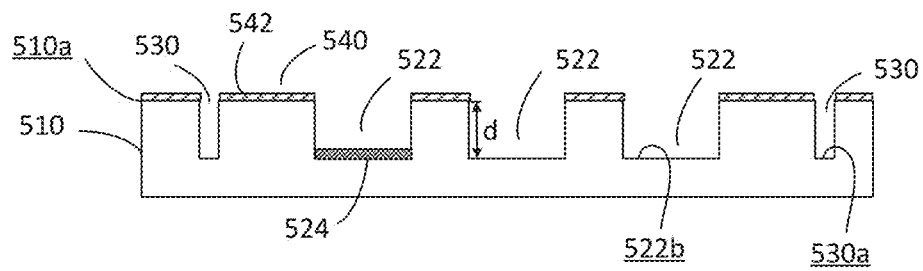

Embodiments of the disclosed device comprise a plurality of spaced apart arrays disposed on the upper surface of the substrate, the arrays comprising a plurality of reaction vessels positioned on, or embedded within, the upper surface of the substrate, and a hydrophilic ring surrounding each array, the hydrophilic ring positioned on, or embedded within the upper surface of the substrate. FIGS. 5A and 5B are cross-sectional diagrams, along line A-A of FIG. 1, illustrating two different exemplary arrangements of the reaction vessels and hydrophilic rings. In FIG. 5A, the reaction vessels 522 and hydrophilic ring 530 are disposed on the upper surface 510a of the substrate 510. Unoccupied regions 540 may comprise a hydrophobic coating 542. In some embodiments, reaction vessels 522 and hydrophilic rings 530 disposed on the upper surface of the substrate have an upper surface 522a, 530a, respectively, at a height H of from 0 μm to 10 μm above the substrate surface, such as a height H of from 1 μm to 10 μm, 2 μm to 10 μm, 3 μm to 8 μm, or 4 μm to 6 μm. When the reaction vessels 522 have an upper surface 522a at a zero height above the substrate surface 510a, the reaction vessels 522 are patterned hydrophilic regions of the substrate surface 510a. When the reaction vessels and hydrophilic rings have an upper surface at a non-zero height above the substrate surface, the reaction vessels 530 are in the form of pedestals rising above the substrate surface 510a. The raised upper surfaces may facilitate loading samples and reagents onto the hydrophilic upper surface 522a of the reaction vessels by making the reaction vessels 522 easier to visualize. The reaction vessels 522 of FIG. 5A have a wall-less geometry (i.e., a sample placed on the upper surface 522a is not in contact with any vertical or substantially vertical wall) and do not define containers having a volume in the traditional sense. Instead, limited volumes of aqueous-based samples and reagents localize to the hydrophilic upper surface 522a; in other words, a sample or reagent droplet may reside solely on the hydrophilic upper surface 522a. Advantageously, the hydrophobic coating 542 applied to unoccupied regions 540 aids in confining the sample and reagent volumes to the hydrophilic surfaces 522a of the reaction vessels 522 by preventing wetting beyond the reaction vessel. Thus, even when the reaction vessel 522 has an upper surface 522a at a zero height above the substrate surface 522a, the hydrophobic coating 542 surrounding the reaction vessels 522 serves as a boundary confining the sample and reagent In FIG. 5B, the reaction vessels 522 and hydrophilic ring 530 are embedded within the upper surface 510a of the substrate 510, such that the reaction vessels 522 define containers with a volume in the customary sense. Unoccupied regions 540 may comprise a hydrophobic coating 542. As described in detail below, the embedded reaction vessels 522 and hydrophilic ring are formed by removing portions of the substrate to a desired depth. In some embodiments, the depth d is a non-zero depth from greater than 0 μm to 200 μm, such as a depth d of from 0.5 μm to 150 μm, 0.5 μm to 100 μm, 1 μm to 100 μm, 10 μm to 100 μm, 25 μm to 100 μm, or 50 μm to 100 μm. The depth may facilitate loading samples and reagents into the reaction vessels by making the reaction vessels easier to visualize and/or by confining a volume of sample and/or reagent to the reaction vessels. Advantageously, the hydrophobic coating 542 applied to unoccupied regions 540 aids in confining sample and reagent volumes to the hydrophilic surfaces 522b of the reaction vessels 522.

With reference to FIG. 1, the reaction vessels 122, may have a diameter $D_2$ of from greater than 0 mm to 0.8 mm, such as a diameter ≤0.8 mm, such as ≤0.6 mm, ≤0.5 mm, from 0.1 mm to 0.8 mm, 0.2 mm to 0.8 mm, from 0.2 mm to 0.7 mm, or from 0.2 mm to 0.6 mm. In some embodiments, regardless of whether the reaction vessel is disposed on the substrate surface (see, e.g., reaction vessel 522 of FIG. 5A) or embedded within the substrate surface (see, e.g., reaction vessel 522 of FIG. 5B), the reaction vessel may accommodate fluids having a volume of up to 100 nL. With respect to FIG. 5A, when the reaction vessel 522 is disposed on the substrate surface 510a such that an upper surface 522a of the reaction vessel 522 has a height H of from 0 μm to 10 μm above the substrate surface, the "volume" of the reaction vessel 522 is the volume of a droplet that can be accommodated on the upper surface 522a. With respect to FIG. 5B, when the reaction vessel 522 is embedded within the substrate surface 510a, the reaction vessel 522 has a volume in the customary sense. In some embodiments, each reaction vessel independently has a volume of from 1 nL to 100 nL, such as 1 nL to 50 nL, 5 nL to 50 nL, 10 nL to 40 nL or 15 nL to 30 nL.

In any of the foregoing or following embodiments, the substrate may comprise glass (e.g., fused silica, borosilicate glass), or an organic polymer. In some embodiments, the substrate comprises glass, polydimethylsiloxane (PDMS), or polypropylene (PP). In certain embodiments, the substrate comprises glass. In any or all of the foregoing or following embodiments, the substrate material may be a rigid material. In some embodiments, the substrate material is transparent to facilitate optical imaging and detection of the reaction vessel contents. In any of the foregoing or following embodiments, the substrate may have any desired dimensions of length, width, and height. In some embodiments, the substrate is sized to facilitate use with automated platforms for sample/reagent dispensing and/or analysis. For example, the substrate may have a size similar to that of a microscope slide. In some implementations, the substrate has a length of from 25 mm to 250 mm and a width of from 10 mm to 100 mm. For example, the substrate may have a length×width of 75 mm×25 mm, 75 mm×50 mm, 228 mm×76 mm, 48 mm×28 mm, 38 mm×12 mm, or any other size suitable for use with a desired dispensing and/or analysis platform. The substrate may have a greatest thickness of from 0.5 mm to 2.5 mm, such as from 0.75 mm to 1.5 mm or 1 mm to 1.5 mm.

Unoccupied regions 140, 240, 540 of the substrate surface are hydrophobic. In some embodiments, the unoccupied regions are rendered hydrophobic by application of a hydrophobic coating, e.g., hydrophobic coating 542 of FIGS. 5A and 5B. In some embodiments, the hydrophobic coating comprises a hydrophobic silane. Exemplary silanes include, but are not limited to heptadecafluoro-1,1,2,2-tetrahydrodecyl-dimethylchlorosilane (PFDS), 1H,1H,2H,2H-perfluorooctyl triethoxysilane (FOTS), or trichloro(octadecyl)silane (OTS).

Advantageously, the substrate has a surface that is natively hydrophilic or can be functionalized to provide a hydrophilic surface. For example, glass is hydrophilic. The substrate material may be selected to exhibit minimal surface adsorption for components of different samples, e.g., proteins, lipids, nucleic acids, and the like. Alternatively, the substrate surface may be modified to minimize surface adsorption of components within the sample dispensed into the reaction vessels. For example, the surface may be modified with a passivation coating 524 (e.g., as shown in FIGS. 5A, 5B). In some embodiments, substrate comprises glass and the passivation coating comprises a polyalkylene glycol, dextran, or a haloakyl silane. Exemplary passivation coatings include, but are not limited to, coatings comprising polyethylene glycol, dextran, dichlorodimethylsilane, and dichlorodiethylsilane.

Figure 6:
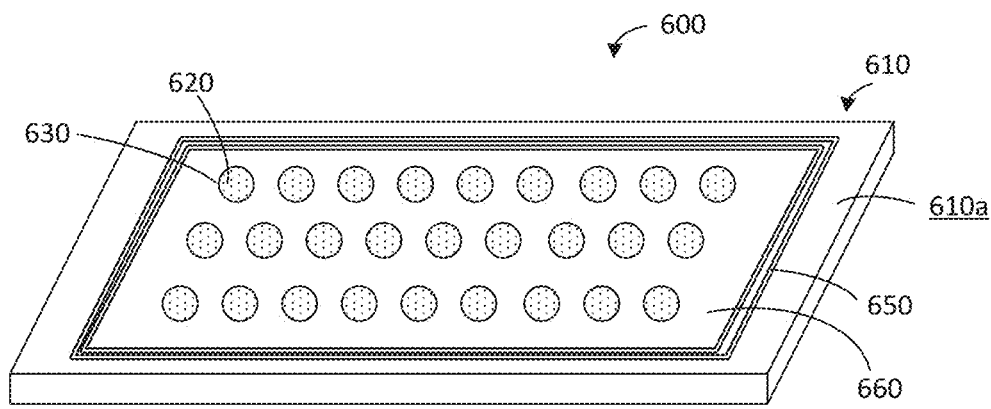
FIG. 6 is a schematic diagram depicting a perspective view of another exemplary embodiment of the disclosed device comprising a plurality of arrays, each array including a plurality of reactor vessels, the device further including a spacer and a cover.

Another exemplary embodiment of the disclosed device 600, is illustrated in FIG. 6. The device 600 comprises a substrate 610, a plurality of arrays 620 disposed on or embedded within an upper surface 610*a* of the substrate 610, and a hydrophilic ring 630 surrounding each array 610, the hydrophilic ring 630 disposed on or embedded within the upper surface 610*a* of the substrate 610. The device 600 further comprises a spacer 650 (e.g., a gasket or sealing ring) surrounding the plurality of arrays 620 and hydrophilic rings 630, and a cover 660 on top of the spacer 650. The device 600 may further comprise a sealing membrane (not shown) between the spacer 650 and the cover 660, and a cover. Advantageously, the spacer 650 and cover 660 can facilitate handling of the device 600 and/or prevent evaporation of reaction vessel contents. In certain embodiments, the substrate 610, the cover 660 and, optionally, the spacer 650 are formed from a material that is transparent to optical light (e.g., glass). In one embodiment, the spacer comprises glass and is adhered to the substrate by any suitable means, such as by using a silicone adhesive. In one implementation, the cover comprises a thin plate (e.g., 25-50 µm) of polydimethylsiloxane.

Exemplary, non-limiting embodiments of a method of making a device comprising a substrate having an upper surface, a plurality of spaced apart arrays, the arrays comprising a plurality of reaction vessels positioned on the upper surface of the substrate, and a hydrophilic surrounding each array, the hydrophilic ring positioned on the upper surface of the substrate include: providing a substrate 112 having an upper surface with an anti-reflective material layer and a photoresist material layer disposed on the upper surface; selectively removing portions of the photoresist material layer and the anti-reflective material layer to provide exposed regions and unexposed regions; treating the substrate with a hydrophobic reagent to form a hydrophobic coating on surfaces of the exposed regions; and forming one or more arrays, each array comprising a plurality of reactions vessels, and a ring surrounding each array by removing remaining photoresist material layer and anti-reflect material layer from the unexposed regions to provide newly exposed regions of the upper surface of the substrate, the newly exposed regions defining the one or more arrays and the ring surrounding each array, wherein the newly exposed regions are hydrophilic such that surfaces of the reaction vessels and the rings are hydrophilic. Unoccupied regions of the substrate (i.e., regions other than the reaction vessels and hydrophilic rings) remain hydrophobic. In some embodiments, the method further comprises etching the exposed regions to remove a portion of the substrate in the exposed regions to a depth of up to 10 µm, such as a depth of from greater than 0 µm to 10 µm, from 1 µm to 10 µm, from 2 µm to 10 µm, from 3 µm to 8 µm, or from 4 µm to 6 µm.

Exemplary, non-limiting embodiments of a method of making a device comprising a substrate having an upper surface, a plurality of spaced apart arrays, each array comprising a plurality of reaction vessels embedded within the upper surface of the substrate, and a hydrophilic surrounding each array, the hydrophilic ring embedded within the upper surface of the substrate include: providing a substrate having an upper surface with an anti-reflective material layer and a photoresist material layer disposed on the upper surface; selectively removing portions of the photoresist material layer and the anti-reflective layer to provide exposed regions and unexposed regions; etching the exposed regions to remove a portion of the substrate in the exposed regions to provide etched exposed regions having a depth of up to 200 µm, wherein the etched exposed regions define one or more arrays, each array comprising a plurality of reaction vessels, and a ring surrounding each array; removing the removing photoresist material layer and the chromium layer from the unexposed regions; treating the upper surface of the substrate with a hydrophobic reagent to provide a hydrophobic coating on the upper surface; masking the upper surface such that the etched exposed regions remain unmasked; and removing the hydrophobic coating from the etched exposed regions. In some embodiments, the exposed regions are etched to a depth of from greater than 0 µm to 200 µm, such as from 0.5 µm to 150 µm, 0.5 µm to 100 µm, 1 µm to 100 µm, 10 µm to 100 µm, 25 µm to 100 µm, or 50 µm to 100 µm.

In any of the foregoing or following embodiments, selectively removing portions of the photoresist material layer and anti-reflective layer may comprise placing a photomask over the photoresist material layer, irradiating exposed areas of the photoresist material layer to pattern the photoresist material layer, developing the photoresist material layer to remove exposed regions of the photoresist material layer, and subsequently removing the underlying anti-reflective material layer from the exposed regions. Developing the photoresist material layer may comprise dissolving exposed regions of the photoresist material layer with a compatible developing solution. In some embodiments, the anti-reflective layer comprises chromium, and the chromium is removed by chemical etching. In some implementations, the chemical etching solution comprises ceric ammonium nitrate and nitric acid, or ceric ammonium nitrate and perchloric acid.

In any of the foregoing or following embodiments, etching the exposed regions may comprise chemical etching. In some embodiments, the substrate comprises glass and chemical etching comprises etching with an etching solution comprising hydrofluoric acid.

In any of the foregoing or following embodiments, treating the substrate with a hydrophobic reagent to form a hydrophobic coating on surfaces of the exposed regions may comprise drying the device, exposing the device to oxygen plasma, applying a solution comprising the hydrophobic reagent to the upper surface of the substrate, and incubating the device for an effective period of time to form the hydrophobic coating on the surfaces of the exposed regions. Suitable hydrophobic reagents include, but are not limited to, hydrophobic silanes such as heptadecafluoro-1,1,2,2-tetrahydrodecyl-dimethylchlorosilane (PFDS), 1H,1H,2H,2H-perfluorooctyl triethoxysilane (FOTS) and trichloro(octadecyl)silane (OTS). In some implementations, the hydrophobic reagent comprises PFDS, such as a 2% (v/v) solution of PFDS in 2,2,4-trimethylpentane. In some embodiments, the effective period of time is from 15 minutes to 2 hours, such as from 15-60 minutes, or 20-40 minutes.

In some embodiments, the method further comprises applying a passivation layer to surfaces of the reaction vessels and rings. For example, a passivation coating may be added when the substrate comprises glass. Advantageously, the passivation coating reduces adsorption of sample components to the hydrophilic surfaces of the reaction vessels and rings. Applying the passivation coating may include drying the device, applying a solution comprising a passivation reagent to surfaces of the reaction vessels and rings, and incubating the device for an effective period of time to form the passivation coating. In some embodiments, the passivation coating can be applied to the entire substrate surface, which is then incubated to form the passivation coating. In some embodiments, the passivation coating comprises a polyalkylene glycol, dextran, or a haloakyl silane. Exemplary passivation coatings include, but are not limited to, coatings comprising polyethylene glycol, dextran, dichlorodimethylsilane, and dichlorodiethylsilane.

Figure 7:
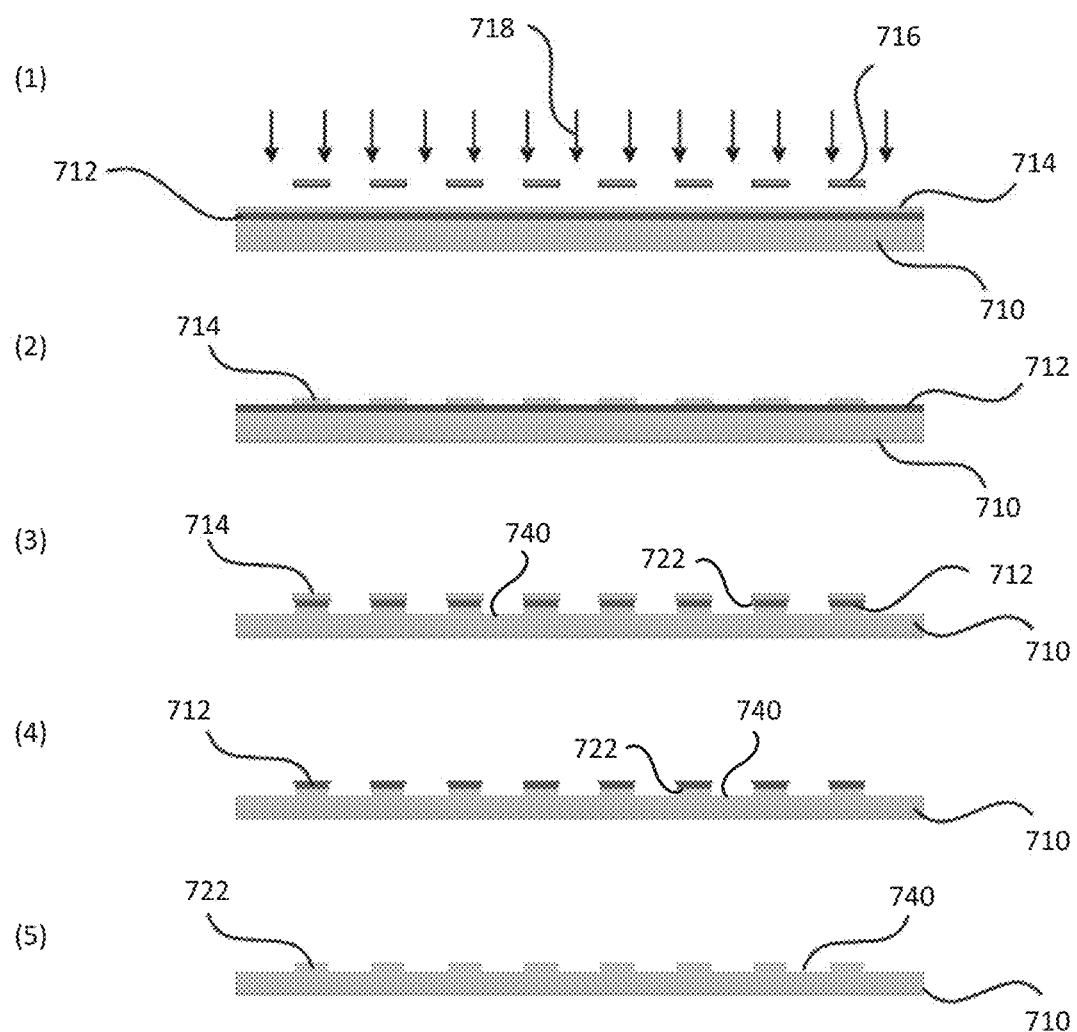
FIG. 7 is a schematic diagram of one exemplary method for making a device as disclosed herein, wherein reaction vessels in an array and a hydrophilic ring surrounding the array are disposed on an upper surface of a substrate.

FIG. 7 illustrates one exemplary embodiment of a method for making a device as disclosed herein, wherein the reaction vessels and hydrophilic rings are disposed on the upper surface of the device substrate. In step (1), a substrate 710 coated with an anti-reflective material layer 712 and a photoresist material layer 714 is provided. A photomask 716 is placed over the photoresist material layer 714 and irradiated with light 718 (e.g., ultraviolet light) to transfer a pattern of the photomask 716 to the photoresist material layer 714 (step (2)). The anti-reflective material layer 712 can be configured to control reflection and absorption of the light 718. In some embodiments, the anti-reflective material layer comprises a chromium layer. Portions of the exposed anti-reflective material layer 712 are removed by etching (step (3)). Optionally, as shown in step 3, exposed portions of the substrate are etched to remove a portion of the substrate in the exposed regions 740 (e.g., up to a depth of 10 µm) to yield a patterned substrate 710 that comprises a plurality of reaction vessels 722, wherein the anti-reflective material layer 712 and photoresist material layer 714 remain on an upper surface of the reaction vessels 722. The photoresist material layer 714 and anti-reflective material layer 712 remaining on the upper surface of the reaction vessels 722 are removed with further chemical etching, as shown in steps (4) and (5). In some embodiments, a hydrophobic coating (not shown) is applied to the exposed regions 740 prior to proceeding with steps (4) and (5).

Figure 8:
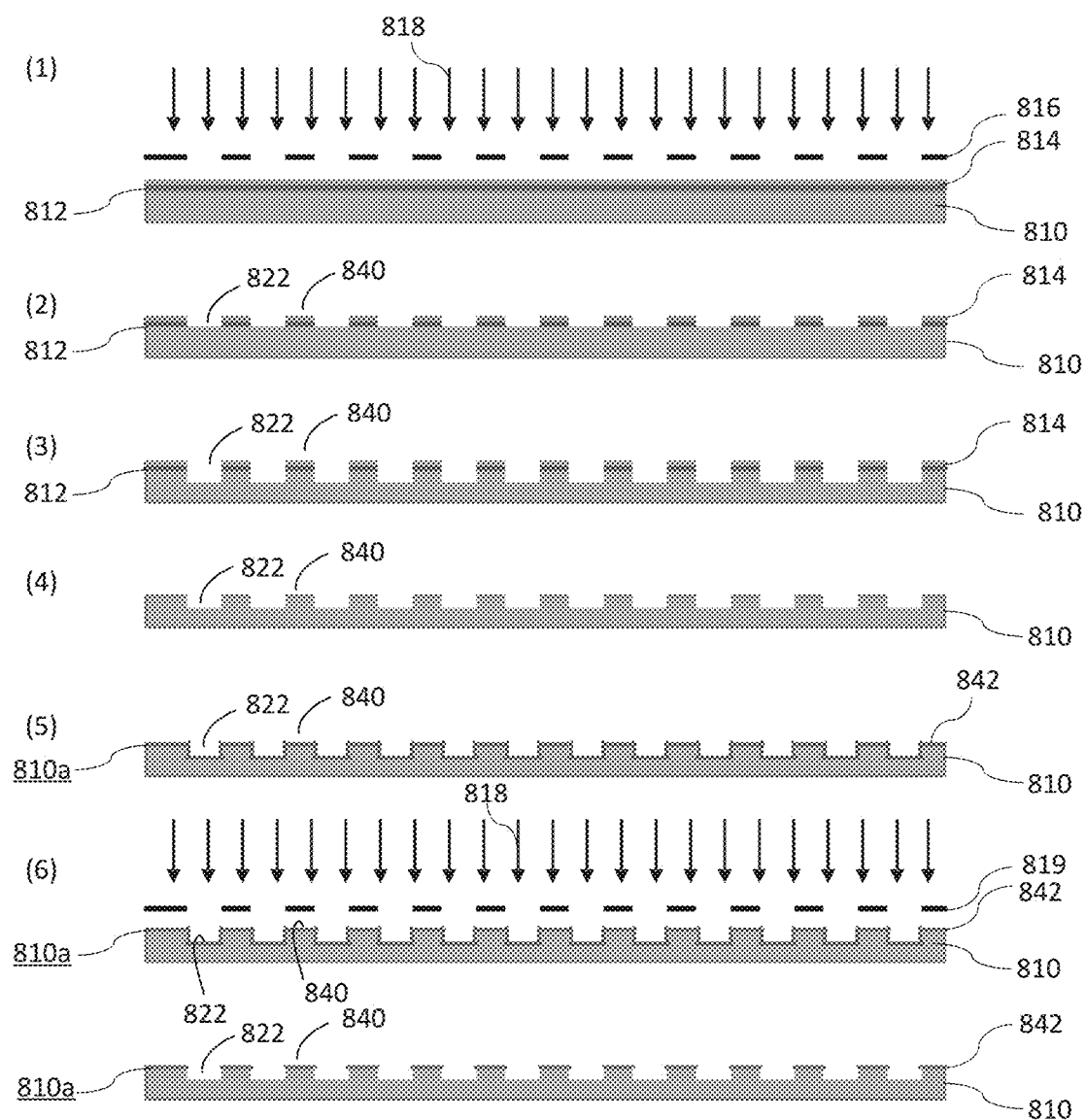
FIG. 8 is a schematic diagram of one exemplary method for making a device as disclosed herein, wherein reaction vessels in an array and a hydrophilic ring surrounding the array are embedded within an upper surface of a substrate.

FIG. 8 illustrates one exemplary embodiment of a method for making a device as disclosed herein, wherein the reaction vessels and hydrophilic rings are embedded within the upper surface of the device substrate. In step (1), a substrate 810 coated with an anti-reflective material layer 812 and photoresist material layer 814 is provided. A photomask 816 is placed over the photoresist material layer 814 and irradiated with light 818 (e.g., ultraviolet light) to transfer a pattern of the photomask 816 to the photoresist material layer 814 (step (2)). The anti-reflective material layer 812 can be configured to control reflection and absorption of the light 818. In some embodiments, the anti-reflective material layer comprises a chromium layer. Portions of the exposed anti-reflective material layer 812 are removed by etching (step (2)). Exposed portions of the substrate 810 are etched to remove a portion of the substrate in the exposed regions (e.g., up to a depth of 200 µm) to yield a patterned substrate 810 that comprises a plurality of reaction vessels 822, wherein the anti-reflective material layer 812 and photoresist material layer 814 remain on unexposed, unoccupied regions 840. In step (4), the anti-reflective material layer 812 and photoresist material layer 814 are removed from the unoccupied regions 840. In step (5), a hydrophobic coating 842 is applied to the upper surface 810a of the substrate 810. In step (6), a photomask 819 is placed over the substrate 810 and irradiated with light 818 (e.g., ultraviolet light) to remove the hydrophobic coating 842 from surfaces of the reaction vessels 822. Following step 6, unoccupied regions 840 are coated with the hydrophobic coating 842 and the reaction vessels 822 have hydrophilic surfaces.

Figure 9:
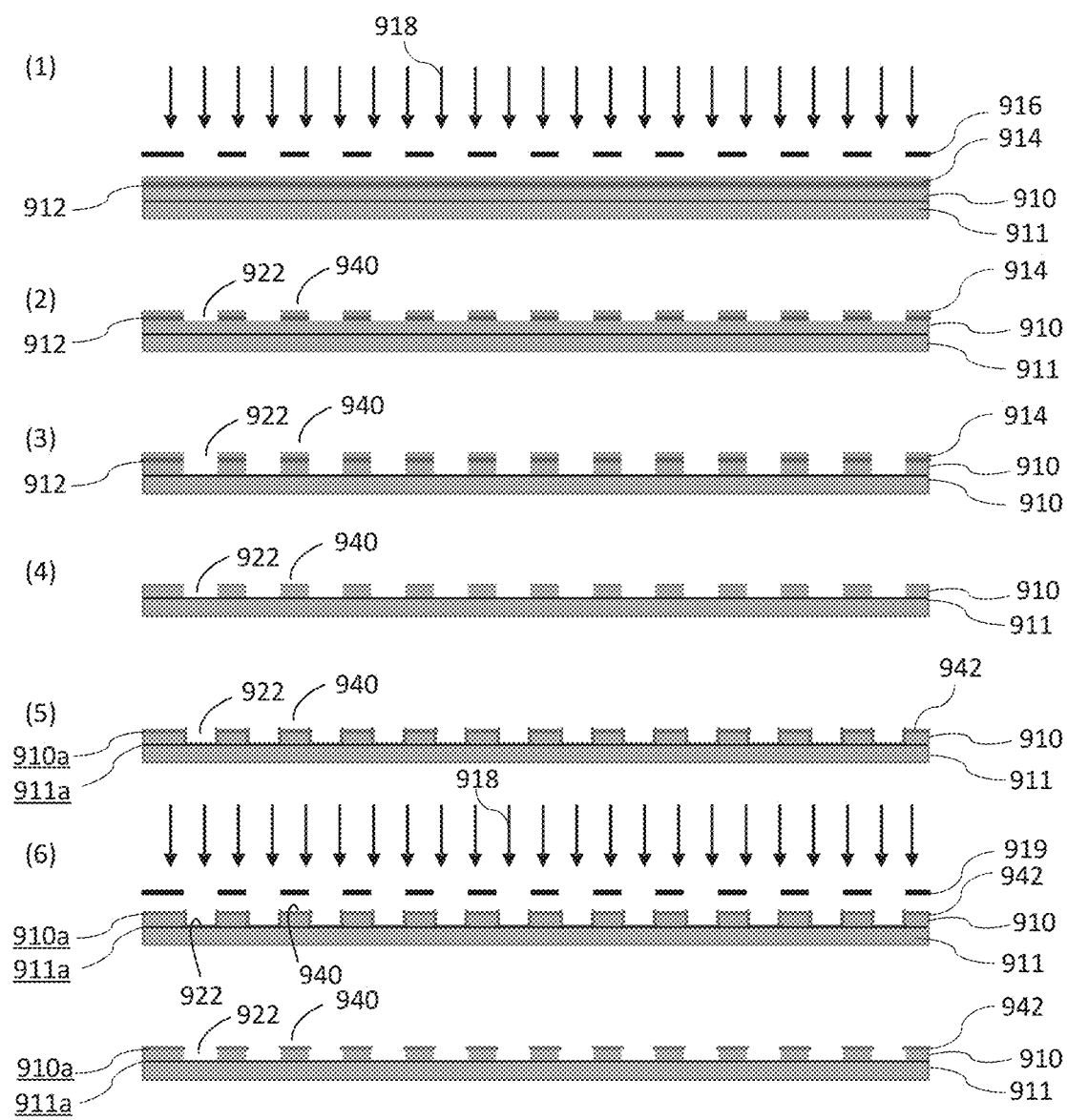
FIG. 9 illustrates another exemplary embodiment of a method for making a device as disclosed herein, wherein the reaction vessels and hydrophilic rings are embedded within the upper surface of the device substrate, and the substrate is constructed from two layers of different materials.

FIG. 9 illustrates another exemplary embodiment of a method for making a device as disclosed herein, wherein the reaction vessels and hydrophilic rings are embedded within the upper surface of the device substrate. In the embodiment of FIG. 9, a substrate 910 is bonded to a support 911. The substrate 910 and support 911 may be constructed of different materials. For example, the substrate material may be selectively etched, or may be more easily etched than the support material. In one non-limiting embodiment, the substrate material is silicon and the support material comprises glass. In step (1), a substrate 910 coated with an anti-reflective material layer 912 and photoresist material layer 914 is provided, wherein the substrate 910 is bonded to a support 911. A photomask 916 is placed over the photoresist material layer 914 and irradiated with light 918 (e.g., ultraviolet light) to transfer a pattern of the photomask 916 to the photoresist material layer 914 (step (2)). In some embodiments, the anti-reflective material layer 914 comprises a chromium layer. Portions of the exposed anti-reflective material layer 912 are removed by etching (step (2)). Exposed portions of the substrate are etched to remove portions of the substrate 910 in the exposed regions to yield a patterned substrate 910 that comprises a plurality of reaction vessels 922, wherein the anti-reflective material layer 912 and photoresist material layer 914 remain on unexposed, unoccupied regions 940. The support 911 remains below the reaction vessels 922. In step (4), the anti-reflective material layer 912 and photoresist material layer 914 are removed from the unoccupied regions 940. In step (5), a hydrophobic coating 942 is applied to the upper surface 910a of the substrate 910 and exposed upper surfaces 911a of the support 911. In step (6), a photomask 919 is placed over the substrate 910 and irradiated with light 918 (e.g., ultraviolet light) to remove the hydrophobic coating 942 from surfaces of the reaction vessels 922. Following step 6, unoccupied regions 940 are coated with the hydrophobic coating 942 and the reaction vessels 922 have hydrophilic surfaces.

Iv. Method of Using the Device

Exemplary, non-limiting embodiments of a method of using a device as disclosed herein include: providing a device as disclosed herein, transferring a volume of a sample to a reaction vessel in an array of the device, wherein the volume is a non-zero amount ≤100 nL; processing the sample in the reaction vessel; adding a volume of a composition comprising one or more isobaric tags to the reaction vessel; dispensing an aqueous droplet onto the array, the aqueous droplet having a sufficient volume to cover a surface area of the array, whereby the aqueous droplet, fluid contents of the reaction vessel, and any fluid contents of other reaction vessels in the array are combined to form a mixture; and collecting the mixture for subsequent analysis. In any of the foregoing or following embodiments, the sufficient volume of the aqueous droplet may be from 1 μL to 20 μL.

The sample may be any liquid, semi-solid or solid substance (or material). In some embodiments, the sample is a biological sample. A biological sample is any solid or fluid sample obtained from, excreted by or secreted by any living organism, including without limitation, single celled organisms, such as bacteria, yeast, protozoans, and amoebas among others, multicellular organisms (such as plants or animals, including humans). In some implementations, a biological sample is a biological fluid obtained from, for example, blood, plasma, serum, urine, bile, ascites, saliva, cerebrospinal fluid, aqueous or vitreous humor, a bodily secretion, a transudate, an exudate (for example, fluid obtained from an abscess or any other site of infection or inflammation), or fluid obtained from a joint (for example, a normal joint or a joint affected by disease). A biological sample can also be a sample obtained from any organ or tissue (including a biopsy or autopsy specimen, such as a tumor biopsy) and/or can include a cell (whether a primary cell or cultured cell) or medium conditioned by any cell, tissue or organ. Illustrative biological samples include nanoscale biological samples (i.e., containing low- or sub-nanogram (<1 ng) amounts of protein). In certain embodiments, the biological sample comprises one or more cells. For example, the biological sample may include from 1-500 cells, 1-250 cells, 1-100 cells, 1-50 cells, 1-10 cells, or 1-5 cells. In particular examples, the biological sample is a single cell. The cell may be obtained from a subject, such as an animal subject. In some embodiments, the subject is human. In some examples, the subject is one that is at risk or has acquired a particular condition or disease.

A volume of the sample is transferred to a reaction vessel in an array of the device. The volume of the sample is a non-zero amount ≤100 nL. In some embodiments, the volume of the sample is ≤40 nL, ≤30 nL, ≤20 nL, ≤10 nL, or ≤1 nL. In some implementations, the sample comprises a single cell. a single cell typically has a diameter of 10-100 μm, such as 10-30 μm, and has a volume corresponding to the cell size, such as a volume of 0.5 pL to 1 nL.

Biochemical analyses of single cells or populations of cells typically require one or more preparation steps prior to the analytical measurement. In any or all of the foregoing or following embodiments, processing a biological sample may comprise performing lysis, extraction, reduction, alkylation, digestion, chemical labeling, acidification, or any combination thereof. For example, the sample may be subjected to protein digestion for bottom-up proteomics. The sample may be analyzed without protein digestion for top-down proteomics. Small molecules such as metabolites within the sample may be derivatized for improved detection.

The method includes adding isobaric tags to the reaction vessel containing the biological sample. Isobaric tags are chemical groups that have nominally identical masses (isobaric), but vary in the distribution of heavy isotopes within the structure. The isobaric tags may include reactive moieties capable of reacting with groups present in certain biological molecules. For example, some isobaric tags comprise amine-reactive groups, cysteine-reactive groups, or carbonyl-reactive groups, making them suitable labels for proteins and peptides. In any of the foregoing or following embodiments, the isobaric tags may be a selection of tandem mass tags. In some embodiments, a tandem mass tag comprises an amine-reactive group (e.g., an N-hydroxysuccinimide ester group), a spacer, and a "mass reporter," wherein the mass reporter is used to distinguish the tags from one another.

Figure 10:
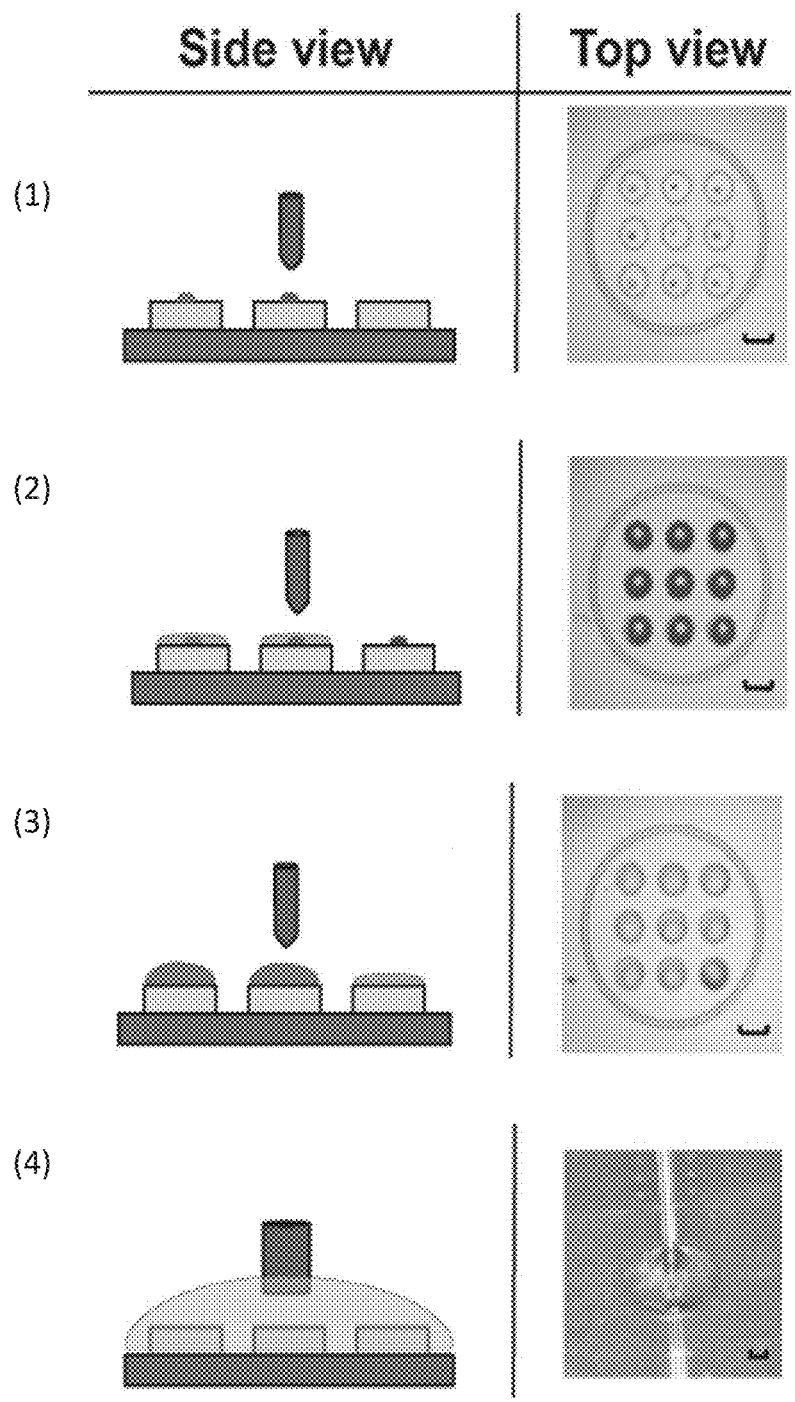
FIG. 10 illustrates one exemplary method of using a device as disclosed herein.

FIG. 10 illustrates one exemplary method of using an N2 chip as disclosed herein. In the embodiment of FIG. 10, the reaction vessels are disposed on the substrate surface and appear as "pillars." In step (1), a volume of biological sample (e.g., a sample comprising a single cell) is dispensed onto each reaction vessel. In step (2), the biological sample is processed by addition of one or more processing reagents (e.g., lysis, reduction, alkylation, and/or digestion reagents) to each reaction vessel. In step (3), a volume of a composition comprising one or more isobaric tags is added to each reaction vessel. In step (4), an aqueous droplet having a sufficient volume to cover a surface area of all reaction vessels in the array is dispensed onto the array, thereby pooling contents of all reaction vessels in the array to form a mixture. The mixture is then collected (e.g., by aspiration) for subsequent analysis.

As the reaction vessels may in some cases be smaller than vessels that can allow for dispensing samples and reagents by hand, automated platforms for sample preparation may be used in conjunction with the disclosed devices. One exemplary automated system, the cellenONE® F1.4 system (Cellenion, France) is capable of dispensing single cell biological samples and nanoliter volumes of reagents for cell lysis, protein reduction, alkylation, and digestion.

In some embodiments, a robotic platform with submicron positioning accuracy and capacity for accurately handling picoliter volumes may be used to dispense samples (e.g., cells) and reagents into nanodroplets and to retrieve samples for subsequent analysis. Such robotic platforms may be capable of dispensing samples and reagents into reaction vessels with subnanoliter precision and ≤1 μm XYZ resolution (see, e.g., Zhu et al., *Anal. Chem.* 85, 6723-6731, (2013)).

In certain embodiments, the disclosed N2 chip reduces total processing volumes (the volume of the dispensed sample plus the total volume of all reagents required for sample preparation) from the conventional tens or hundreds of microliters to ≤500 nL, ≤250 nL, ≤100 nL, ≤50 nL, or ≤30 nL. All processing steps take place within a single reaction vessel, avoiding the need to transfer samples to from one reaction vessel to another for processing, and thus avoiding the associated sample losses that such transfer steps would incur. Advantageously, the N2 chip also reduces reagent volumes and associated costs, while providing more concentrated processed samples than other devices requiring larger volumes. The smaller volumes also dramatically reduce surface contact to minimize analyte losses while also enhancing reaction kinetics.

In any of the foregoing embodiments, the combined mixture from each array, comprising the processed contents of the reaction vessels within the array, is collected and subsequently analyzed. The analysis can be any analysis suitable for the processed biological sample and compatible with the small volume of the collected mixture. In some embodiments, subsequent analysis is by liquid chromatography-mass spectrometry (LC-MS), liquid chromatography-tandem mass spectrometry (LC-MS-MS), electrospray ionization-mass spectrometry (ESI-MS), or matrix-assisted laser desorption ionization-time of flight mass spectrometry (MALDI-TOF MS), among others. In some examples, sample separation is performed by liquid chromatography or electrophoresis, followed by further MS analysis.

In some examples, the process may be performed in a humidity-controlled chamber. In some examples, the humidity-controlled chamber is maintained at a relative humidity within the range from about 80% to about 100%, e.g., at about 95% humidity. For chemical or enzymatic processing steps that require extended reaction times at room temperature or elevated temperatures, a cover plate may be employed to minimize evaporation. The humidity in the device may be maintained by an optional cover placed over the upper surface of the substrate (see, e.g., FIG. 6). The cover further may minimize evaporation and sample loss.

In certain non-limiting embodiments, the N2 chip is used to prepare biological samples for proteomics—the systematic, large-scale analysis of proteins. Proteomics may be used to identify and quantify peptides and intact proteins present in a cell, tissue, or organism. The N2 chip also may be used to prepare biological samples for metabolomics—the analysis of metabolites, or lipidomics—the analysis of lipids. In some embodiments, the N2 chip is used to prepare biological samples for single-cell (SC) proteomics, metabolomics, and/or lipidomics.

In some embodiments, analyzing the processed sample can identify unique species, including but not limited to proteins or fragments thereof, lipids, or metabolites. In some implementations, analyzing a processed biological sample can identify at least 100, at least 500, at least 1,000, or at least 1,500 unique species (e.g., proteins or fragments thereof, lipids, and/or metabolites respectively). In certain implementations, at least 2,000 unique species (e.g., at least 2,000 unique proteins or peptides) can be identified in a sample, such as at least 3,000 unique species, at least 4,000 unique species, at least 5,000 unique species, at least 7,000 unique species. In one example, when coupled with highly sensitive LC-MS, an N2 chip enabled reproducible and quantitative measurements of ~2457 proteins, from 12 TMT sets in 108 single cells.

Advantageously, embodiments of the disclosed N2 chip provide high-throughput and streamlined single-cell proteomics sample preparation workflow compared to prior nanowell devices (Tsai et al., *Mol Cell Proteomics* 2020, 19:828-838; Dou et al., *Anal Chem* 2019, 91:13119-13127). Sample volumes are reduced (e.g., ≤50 nL) and sample preparation is "single pot" within each reaction vessel, thereby minimizing losses that occur through surface binding and/or transfer steps to multiple reaction vessels. The reduced volume also enhances reaction kinetics during sample processing. In some embodiments, the N2 chip reduces nanowell volumes to ~30 nL and improves the protein/peptide sample recovery by 230% compared with the prior devices. Embodiments of the N2 chip also significantly simplify the TMT-based isobaric labeling workflow by eliminating the tedious sample pooling step (e.g., aspirating, transferring, and combining). In one embodiment, with an N2 chip including a grid of 3×9 arrays, each array comprising 9 reaction vessels, 243 single cells can be analyzed in a single microchip, representing a 5-fold increase over the prior device, which allowed analysis of just 44 single cells. With more reaction vessels per array and/or more arrays per device, each N2 chip may have a capacity of over 1,000 cells per chip (e.g., a chip having 40 arrays, each array including 25 reaction vessels in a 5×5 grid). In some embodiments, the N2 chip allows throughput of more than 200 cells per day, and allows routine analysis of more than 1,000 single cells. The TMT pooling step is simplified by adding a microliter droplet on the nested nanowells to combine labeled single-cell samples, rather than having to aspirate each reaction vessel separately and then combine the aspirated contents. In some embodiments, sample recovery and digestion efficiency are enhanced with a reaction vessel diameter of 0.2 mm or less, corresponding to a total droplet volume of less than 5 nL In contrast, current microfluidic techniques have a sample processing volume >10,000 times larger than a single cell (e.g., a single cell having a volume of 0.5 pL to 1 nL). Moreover, results obtained with some embodiments of the N2 chip were highly reproducible.

V. Representative Embodiments

Certain representative embodiments are exemplified in the following paragraphs.

A device, comprising a substrate having an upper surface; plurality of spaced apart arrays disposed on the upper surface of the substrate, the arrays comprising a plurality of reaction vessels positioned on, or embedded within, the upper surface of the substrate, wherein the reaction vessels have a hydrophilic surface and a diameter from greater than 0 mm to 0.8 mm, such as greater than 0 mm to 0.6 mm, greater than 0 mm to 0.5 mm, from 0.1 mm to 0.8 mm, 0.2 mm to 0.8 mm, from 0.2 mm to 0.7 mm, or from 0.2 mm to 0.6 mm; and a hydrophilic ring surrounding each array, the hydrophilic ring positioned on, or embedded within, the upper surface of the substrate, wherein unoccupied regions of the upper surface of the substrate are hydrophobic.

The device of the preceding paragraph, wherein the reaction vessels have a volume no greater than 100 nL, no greater than 40 nL, no greater than 30 nL, no greater than 25 nL, no greater than 20 nL, no greater than 15 nL, no greater than 10 nL, or no greater than 5 nL.

The device of either of the preceding paragraphs, wherein the arrays comprise from 3 to 100 reaction vessels configured in a grid pattern, from 9 to 81 reaction vessels configured in a grid pattern, from 9 to 25 reaction vessels configured in a grid pattern, or from 9 to 16 reaction vessels configured in a grid pattern.

The device of any of the preceding paragraphs, wherein (i) the plurality of arrays comprises from 2 to 100 spaced apart arrays; or (ii) the plurality of arrays comprises at least one row of spaced apart arrays; or (iii) both (i) and (ii).

The device of any of the preceding paragraphs, wherein the plurality of arrays comprises from 9 to 100 arrays, from 25 to 100 arrays, or from 40 to 100 arrays.

The device of any of the preceding paragraphs, wherein the plurality of arrays comprises at least two rows, at least three rows, at least four rows, or at least five rows, of spaced apart arrays.

The device of any one of the preceding paragraphs, wherein (i) the arrays are positioned on the upper surface of the substrate and each reaction vessel has an upper surface at a height of from 0 µm to 10 µm above the upper surface of the substrate, such as a height of 1 µm to 10 µm, 2 µm to 10 µm, 3 µm to 8 µm, or 4 µm to 6 µm; or (ii) the hydrophilic rings are positioned on the upper surface of the substrate and has an upper surface at a height of from 0 µm to 10 µm above the upper surface of the substrate, such as a height of 1 μm to 10 μm, 2 μm to 10 μm, 3 μm to 8 μm, or 4 μm to 6 μm; or (iii) both (i) and (ii).

The device of any of the first six paragraphs, wherein (i) the arrays are embedded within the upper surface of the substrate and each reaction vessel has a non-zero depth from greater than 0 μm to 200 μm, such as from 0.5 μm to 150 μm, 0.5 μm to 100 μm, 1 μm to 100 μm, 10 μm to 100 μm, 25 μm to 100 μm, or 50 μm to 100 μm; or (ii) the hydrophilic rings are embedded within the upper surface of the substrate and has a non-zero depth from greater than 0 μm to 200 μm, such as from 0.5 μm to 150 μm, 0.5 μm to 100 μm, 1 μm to 100 μm, 10 μm to 100 μm, 25 μm to 100 μm, or 50 μm to 100 μm; or (iii) both (i) and (ii).

The device of any one of the preceding paragraphs, wherein: (i) the reaction vessels within the arrays are spaced from 0.2 mm to 1.0 mm apart, center-to-center, from adjacent reaction vessels, such as a spacing of 0.3 mm to 0.9 mm, 0.4 mm to 0.8 mm, or 0.5 mm to 0.8 mm; or (ii) adjacent spaced apart arrays have a center-to-center array spacing of from 2.5 mm to 20 mm, such as a spacing of 2.5 mm to 15 mm, 2.5 mm to 10 mm, or 2.5 to 6 mm; or (iii) both (i) and (ii).

The device of any one of the preceding paragraphs, wherein the reaction vessels within a single array are oriented in a square grid, a rectangular grid, or a circle.

The device of any one of the preceding paragraphs, wherein the substrate comprises glass, polydimethylsiloxane (PDMS), polytetrafluoroethylene (PTFE), or polypropylene (PP).

The device of any one of the preceding paragraphs, wherein (i) the device comprises a hydrophobic coating on the unoccupied regions; or (ii) surfaces of the reaction vessels and hydrophilic rings comprise a passivation coating; or (iii) both (i) and (ii).

The device of the preceding paragraph, wherein (i) the hydrophobic coating comprises heptadecafluoro-1,1,2,2-tetrahydrodecyl-dimethylchlorosilane (PFDS), 1H,1H,2H,2H-perfluorooctyl triethoxysilane (FOTS), or trichloro(octadecyl)silane (OTS); or (ii) the passivation coating comprises polyethylene glycol, dextran, dichlorodimethylsilane, or dichlorodiethylsilane; or (iii) both (i) and (ii).

The device of any one of the preceding paragraphs, wherein a single row of spaced apart arrays arranged parallel to a length of the substrate comprises from 4 to 25 arrays, such as 4-20 arrays, 5-20 arrays, 5-15 arrays, or 7-12 arrays.

The device of any one of the preceding paragraphs, wherein the plurality of arrays consists of 27 arrays configured in a 3×9 array grid, each array comprising 9 reaction vessels.

The device of any one of the preceding paragraphs, wherein the plurality of arrays consists of 33 arrays configured in a 3×11 array grid, each array comprising 16 reaction vessels.

A method of making a device according to any one of the preceding paragraphs wherein each array and each hydrophilic ring is positioned on the upper surface of the substrate, the method including providing a substrate having an upper surface with anti-reflective material layer and a photoresist material layer disposed on the upper surface; selectively removing portions of the photoresist material layer and the anti-reflective material layer to provide exposed regions and unexposed regions; treating the upper surface of the substrate with a hydrophobic reagent to form a hydrophobic coating on surfaces of the exposed regions; and forming one or more arrays, each array comprising a plurality of reactions vessels, and a ring surrounding each array by removing remaining photoresist material layer and anti-reflect material layer from the unexposed regions to provide newly exposed regions of the upper surface of the substrate, the newly exposed regions defining the one or more arrays and the ring surrounding each array, wherein the newly exposed regions are hydrophilic.

The method of the preceding paragraph, further comprising etching the exposed regions to remove a portion of the substrate in the exposed regions to a depth of up to 10 μm.

A method of making a device according to any one of the preceding paragraphs wherein each array and each hydrophilic ring is embedded within the upper surface of the substrate, the method including providing a substrate having an upper surface with an anti-reflective material layer and a photoresist material layer disposed on the upper surface; selectively removing portions of the photoresist material layer and the anti-reflective layer to provide exposed regions and unexposed regions; etching the exposed regions to remove a portion of the substrate in the exposed regions to provide etched exposed regions having a depth of up to 10 μm, wherein the etched exposed regions define one or more arrays, each array comprising a plurality of reaction vessels, and a ring surrounding each array; removing the removing photoresist material layer and the chromium layer from the unexposed regions; treating the upper surface of the substrate with a hydrophobic reagent to provide a hydrophobic coating on the upper surface; masking the upper surface such that the etched exposed regions remain unmasked; and removing the hydrophobic coating from the etched exposed regions.

The method of any one of the preceding paragraphs, wherein treating the upper surface of the substrate with the hydrophobic reagent comprises: drying the device; exposing the device to oxygen plasma; applying a solution comprising the hydrophobic reagent to the upper surface of the substrate; and incubating the device for an effective period of time to form the hydrophobic coating on the surfaces of the exposed regions.

The method of any one of the preceding paragraphs further comprising applying a passivation coating to surfaces of the reaction vessels and rings.

A method of using a device as disclosed herein, the method including: providing a disclosed device; transferring a volume of a sample to a reaction vessel in an array of the device, wherein the volume is a non-zero amount ≤100 nL; processing the sample in the reaction vessel; adding a volume of a composition comprising one or more isobaric tags to the reaction vessel; dispensing an aqueous droplet onto the array, the aqueous droplet having a sufficient volume to cover a surface area of the array, whereby the aqueous droplet, fluid contents of the reaction vessel, and any fluid contents of other reaction vessels in the array are combined to form a mixture; and collecting the mixture for subsequent analysis.

The method of the preceding paragraph, wherein the one or more isobaric tags comprises a selection of tandem mass tags.

The method of either of the preceding paragraphs, wherein the sample is a biological sample and processing the biological sample comprises lysis, extraction, reduction, alkylation, digestion, chemical labeling, acidification, or any combination thereof.

The method of any one of the preceding paragraphs, wherein the sample is a biological sample and the subsequent analysis comprises analyzing the mixture to quantify one or more proteins in the biological sample.

VI. Examples

Reagents and Chemicals:

Urea, n-dodecyl-β-D-maltoside (DDM), tris 2-carboxyethyl phosphine (TCEP), iodoacetamide (IAA), ammonium bicarbonate (ABC), triethylammonium bicarbonate (TEAB), trifluoroacetic acid (TFA), anhydrous acetonitrile (a-ACN), and formic acid (FA) were obtained from Sigma (St. Louis, MO, USA). Trypsin (Promega, Madison, WI, USA) and Lys-C (Wako, Japan) were dissolved in 100 mM TEAB before usage. TMTpro™ 16plex, 50% hydroxylamine (HA), Calcein AM, Acetonitrile (ACN) with 0.1% of FA, and water with 0.1% of FA (MS grade) were purchased from Thermo Fisher Scientific (Waltham, MA, USA).

Cell Culture:

Three murine cell lines (RAW 264.7, a macrophage cell line; C10, a respiratory epithelial cell line; SVEC, an endothelial cell line) were obtained from ATCC and cultured at 37° C. and 5% C02 in Dulbecco's Modified Eagle's Medium supplemented with 10% fetal bovine serum and 1× penicillin-streptomycin (Sigma, St. Louis, MO, USA). Three leukemia cell lines (MOLM-14, K562, and CMK) were kindly provided by Dr. Anupriya Agarwal at Oregon Health & Science University. MOLM-14 and K562 cells were grown in RPMI1640 medium supplemented with 10% FBS and 1× penicillin streptomycin, and CMK cells were maintained in RPMI-1640 medium supplemented with 20% FBS and 1× penicillin streptomycin.

Buk-Scale Proteomic Sample Preparation and Mimic Single-Cell Experiments:

The cultured cell lines were collected in a 15 mL tube and centrifuged at 1000×g for 3 min to remove the medium. Cell pellets were washed three times by 1×PBS buffer, then counted to obtain cell concentration. Ten million cells per cell population were lysed in a buffer containing 8M urea in 50 mM ABC in ice. Protein concentration was measured with BCA assay. After protein was reduced and alkylated by DTT and IAA, Lys-C (enzyme-to-protein ratio of 1:40) was added and incubated for 4 h at 37° C. Trypsin (enzyme-to-protein ratio of 1:20) was added and incubated overnight at 37° C. The digested tryptic peptides were acidified with 0.1% TFA, desalted by C18 SPE column, and completely dried to remove the acidic buffer.

After measuring the peptide concentration with BCA assay, samples from three different cell types were mixed at 1:1:1 ratio and used for boost and reference samples. All peptide samples were dissolved with 50 mM HEPES (pH 8.5) followed by mixing with a TMT 10plex™ or TMTpro™ 16plex reagent in 100% ACN. To maintain high labeling efficiency, a TMT-to-peptide ratio of 4:1 (w/w) was used. After 1-h incubation at room temperature, the labeling reaction was terminated by adding 5% HA and incubating for 15 min. The TMT-labeled peptides were then acidified with 0.1% FA and cleaned with C18 stage tips. Before use, different amounts of peptides (0.1 ng for mimic single cell, 0.5 ng for reference, 10 ng for boost) were diluted in 0.1% FA buffer containing 0.1% DDM (w/v) to prevent sample loss at low concentration conditions.

To mimic single-cell proteomics preparation in nanowell chips, 0.1 ng peptide samples in 200 nL buffer from the three cell lines were loaded into 1.2 mm nanowells using a nanoPOTS dispensing robot and incubated for 2 h at room temperature. Next, samples from the same TMT set were collected and combined into a large-size microwell (2.2 mm diameter), which contained 10 and 0.5 ng TMT-labeled peptides for boost and reference samples, respectively.

To deposit these single-cell-level peptide samples to N2 chip, a picoliter dispensing system (cellenONE F1.4®, Cellenion, France) was employed to dispense 0.1 ng peptide in 20 nL buffer in each nanowell. After incubating the chip at room temperature for 2 h, mixed boost and reference samples (10 ng and 0.5 ng, respectively) were equally distributed into each nanowell.

Samples in both the nanowell chip and the N2 chip were completely dried in a vacuum desiccator and stored in a −20° C. freezer until analysis.

Single cell proteomic sample preparation using the N2 chit:

The cellenONE® system (Cellenion, France) was used for both single-cell sorting and sample preparation on the N2 chip. Before cell sorting, all the cells were labeled with Calcein AM (Thermo Fisher) to gate out dead cells and cell debris. After single-cell deposition, 10 nL lysis buffer containing 0.1% DDM and 5 mM TCEP in 100 mM TEAB was dispensed into each nanowell. The N2 chip was incubated at 70° C. for 45 minutes in a humidity box to achieve complete cell lysis and protein reduction. Next, 5 nL of 20 mM IAA was added, followed by reaction incubation for 30 min in the dark. Proteins were digested to peptides by sequentially adding 0.25-ng Lys-C (5 nL) and 0.5-ng-trypsin (5 nL) into the nanowells and incubating for 3 h and 8 h, respectively. For isobaric labeling, 50 ng TMT tag in 10 nL ACN was added into each of the corresponding nanowells according to experimental design. An additional 10 nL 100 mM TEAB buffer was added into each nanowell to compensate for the rapidly evaporated ACN solvent. After 1 h incubation at room temperature, the remaining TMT reagents were quenched by 5 nL of 5% HA. Finally, TMT labeled boost (10 ng) and reference (0.5 ng) peptides were distributed into nanowells. The samples were acidified with 5 nL of 5% FA and dried for long-term storage.

LC-MS/MS Analysis

All the samples were analyzed with a nanoPOTS autosampler (Williams et al., *Anal. Chem.* 2020, 92:10588-10596) equipped with a C18 SPE column (100 µm i.d., 4 cm, 300 Å C18 material, Phenomenex) and an LC column (50 µm i.d., 25 cm long, 1.7 µm, 130 Å, Waters) heated at 50° C. using AgileSleeve column heater (Analytical Sales and Services Inc., Flanders, NJ). Dried samples from nanowell chips or N2 chips were dissolved with Buffer A (0.1% FA in water), then trapped on the SPE column for 5 min. Samples were eluted out from the column using a 120-min gradient from 8% to 45% Buffer B (0.1% FA in ACN) and a 100 nL/min flow rate.

An Orbitrap Eclipse™ Tribrid™ MS (Thermo Scientific, Xcalibur Ver. 4.3.73.11) operated in data-dependent acquisition mode was employed for all analyses for peptides. Peptides were ionized by applying a voltage of 2,200 V and collected into an ion transfer tube at 200° C. Precursor ions from 400-1800 m/z were scanned at 120,000 resolution with an ion injection time (IT) of 118 ms and an automatic gain control (AGC) target of 1E6. During a cycle time of 3 s, precursor ions with >+2 charges and >2E4 intensities were isolated with a window of 0.7 m/z, an AGC target of 1E6, and an IT of 246 ms. The isolated ions were fragmented by a higher energy collisional dissociation (HCD) level of 34%, and the fragments were scanned in an Orbitrap at 120,000 resolution.

A Q-Exactive™ Plus MS (Thermo Scientific, Xcalibur Ver. 4.0.27.19) was used to analyze TMT™ 10plex and TMTpro™ 16plex-labeled peptide samples. The MS1 spectra were collected in Orbitrap at a scan range of 400-1800 m/z, a resolution of 35,000 and an AGC target of 3E6. Top-10 precursor ions with intensities of >3E5 and chargers of >2+ were selected for fragmentation with HCD levels from 26% to 35%, an AGC target of 5E6, and a maximum IT of 300 ms. The fragments were scanned in an Orbitrap at 70,000 resolution.

Database Searching

All the raw files from the Thermo MS were processed by MaxQuant (Ver. 1.6.14.0) (Tyanova et al., *Nat Protoc* 2016, 11:2301-2319) with the UniProtKB protein sequence database of *Mus musculus* species (downloaded on 05/19/2020 containing 17,037 reviewed protein sequences). Reporter ion MS2 was set as the search type and TMT channel correction factors from the vendor were applied. The mass tolerances for precursor ions and fragment ions were set as 4.5 ppm and 20 ppm, respectively in MaxQuant. Specific digestion enzymes were set as Trypsin and LysC. The number of allowed missed cleavages was set as 2. The match tolerance, de novo tolerance, and deisotoping tolerance for MS/MS search were 20, 10, and 7 ppm, respectively. The minimum peptide length was 6 amino acids and the maximum peptide mass was 4600 Da. Protein acetylation in N-terminal and oxidation at methionine were chosen as variable modifications, and protein carbamidomethylation in cysteine residues was set as fixed modification. Both peptides and proteins were filtered with false discovery rates (FDR) of <1% to ensure identification confidence.

Single-Cell Proteomics Data Analysis

SCPCompanion (Ver 15.0, https://www.github.com/scp-ms/SCPCompanion) was used to access the data quality by extracting the summed signal-to-noise ratio (SNR) of single-cell channels (Chent et al., *Nat Methods* 2021, 18:76-83). The corrected reporter ion intensities from MaxQuant were imported into Perseus (Ver. 1.6.14.0) (Tyanova et al., *Nat Methods* 2016, 13:731-740) and were log 2-transformed after filtering out the reverse and contaminant proteins. Proteins containing >70% valid values in each cell type were considered quantifiable. Missing values were imputed based on a standard distribution of the valid values (width: 0.3, downshift: 1.8). The summed reporter ion intensities of the quantifiable proteins were normalized using quantile normalization method. To correct the batch effect from multiple TMT sets, we used the SVA Combat algorithm (Leek et al., *Bioinformatics* 2012, 28:882-883), which is embedded in Perseus. Next, the data matrix was separated by cell types and grouped by TMT channel. Combat algorithm was also applied to minimize the TMT channel effect. The combined matrix was then used for statistical analysis, including principal component analysis (PCA) and hierarchical clustering analysis. ANOVA tests were performed to determine the proteins showing statistically significant abundance differences across the three cell types (Permutation-based FDR<0.05, $S_0=1$), and a 2-way student t-test was applied to explain the significant differences between two groups (p-value <0.05). The processed data were visualized with Graphpad (Prism Ver 8.3.0) and Perseus.

Protein intensities without missing values in each cell type in intra-batch or inter-batches were used to calculate the coefficient of variations (CVs) in Excel (Microsoft office 365). Briefly, for intra-batches, the CVs were calculated using raw protein intensities inside each TMT set and then pooled together to generate the box plots. For inter-batches without batch correction, the CVs were calculated using raw protein intensities across all the TMT sets. To calculate the CVs of intra-batches with batch corrections, raw protein intensities were log 2 transformed and missing values were imputed. After normalization and batch correction using Combat algorithm (Leek et al., *Bioinformatics* 2012, 28:882-883), proteins with imputed values were replaced to 'NaN' and filtered out. The protein intensities were exponentially transformed to calculate the CVs.

The REACTOME pathway analysis was conducted on the STRING-db tool (Ver. 11.0b, https://version-11-0b.string-db.org/). Briefly, cell-type-specific regulated proteins with statistical significance were submitted in the multiple proteins windows and selected an organism of *Mus Musculus*. The results of REACTOME pathways were exported with matched protein and gene lists and FDR values.

Immunofluorescence Staining

Washed cells in PBS were fixed in fresh 4% paraformaldehyde (PFA) for 10 min at room temperature and quenched with 0.1% sodium borohydride for 7 min to get rid of free aldehyde groups for preventing autofluorescence of cells. The cells were then permeabilized and blocked using 1% BSA in PBST (PBS with 0.05% Tween 20) to minimize nonspecific binding of the antibodies. Three recombinant antibodies (Anti-NCAM1, ab220360; Anti-CD14, ab221678; Anti-BST2, ab246508) were purchased from Abcam (Cambridge, MA, USA). The cells were incubated in the diluted primary antibodies (1:1000 anti-CD14, 1:2000 anti-BST2 and 1:1000 anti-NCAM1) overnight at 4° C. in 1×PBS with 1% BSA. Subsequently, the labeled cells were washed with ice-cold PBS followed by incubating with Alexa Flour 546 goat anti-rabbit IgG (Invitrogen Cat #A11010) at 1:1000 dilution in 1×PBS with 1% BSA for an hour at room temperature in the dark. Immunostaining images were visualized with an inverted confocal fluorescence microscope (Zeiss LSM 710) with a 63× objective (NA 0.75). The DAPI nuclear stain was excited by a 405 nm wavelength laser. The dye conjugated antibodies were excited by the Alexa Flour 546 antibody was excited by 561 nm wavelength laser. The antibody fluorescence channel, DAPI fluorescence channel, and bright-field channel were acquired simultaneously. The Zeiss imaging software ZEN (2.1 SP2 version 130.2.518) was used to control the microscope, acquire the data, and export the images.

Integrative Proteomics and Transcriptomics Analysis

Single-cell transcriptomics datasets containing transcript abundance of 11 C10 (Mitchell t al., *ACS Nano* 2016, 10:10173-10185) and 186 RAW (Lane et al., *Cell Syst* 2017, 4:458-469 e455) cells were re-analyzed. Both datasets were generated with Smart-Seq2 protocols. The data of C10 cells was obtained with unit of counts, while data of RAW264.7 cells was obtained with unit of fragments per million (FPM). To allow comparisons, we converted the data of C10 cells with unit of FPM using a python package bioinfokit (Bedre, reneshbedre/bioinfokit: Bioinformatics data analysis and visualization toolkit. DOI: http://doi.org/10.5281/zenodo.3698145 (2021)). Next, scRNASeq data was transformed into log 2 scale. After normalization and scaling, the genes commonly captured across all transcriptomic and proteomic datasets were selected for further correlation and other comparative analyses.

Example 1

N2 Chip Platform Design and Operation

An N2 chip was fabricated on a glass slide using standard photolithography, wet etching, and silane treatment. Briefly, as shown in FIGS. 1 and 4, 27 (3×9) nanowell clusters with a distance $D_1$ of 4.5 mm between adjacent clusters were designed on a single microscope slide (1×3 inches, Telic Company, Valencia, USA). In each cluster, nine nanowells with 0.5-mm diameter $D_2$ and 0.75-mm well-to-well distance $D_3$ were nested together. To facilitate droplet combination and retrieval process, a micro-ring was formed around the nested nanowells. After photoresist exposure, development, and chromium etching, the glass slide was etched to a depth of ~5 μm with buffered hydrofluoric acid (Liang et al., *Methods Mol biol* 2021, 2185:159-179). The freshly etched slide was dried by heating it at 120° C. for 2 h and then treated with oxygen plasma for 3 min (AP-300, Nordson March, Concord, USA). To selectively pattern the chip, 2% (v/v) heptadecafluoro-1,1,2,2-tetrahydrodecyl-dimethylchlorosilane (PFDS, Gelest, Germany) in 2,2,4-trimethylpentane was applied on the chip surface and incubated for 30 min. After removing the remaining chromium layer, all the chromium-covered regions (nanowells and microrings) are hydrophilic, and exposed areas are hydrophobic. Finally, a glass frame was attached to the nanowell chip with epoxy to create a headspace for reaction incubation.

Prior nanowell chips had a nanowell diameter of 1.2 mm, and included individual nanowells arranged in a 4×11 grid on the substrate. Compared to the prior chips, the reduced well diameter of 0.5 mm corresponded to an 82% decrease in contact areas and an 85% decrease in total processing volumes (Table 1). The miniaturized volume resulted in a ~45× increase in trypsin digestion kinetics because both trypsin and protein concentrations were increased by 6.67×. Both the reduced contact area and increased digestion kinetics were expected to enhance scProteomics sensitivity and reproducibility.

TABLE 1

|  | N2 chip | Prior nanowell chip |
| --- | --- | --- |
| Diameter (mm) | 0.5 | 1.2 |
| Contact area (mm$^2$) | 0.20 | 1.13 |
| Total volume (nL) | 30 | 200 |
| Digestion kinetics | 45× | 1× |
| Capacity (cells/chip) | 243 | 44 |
| Measured running time (min/chip, min/cell) | 18, 0.07 | 36.5, 0.83 |

The scProteomics sample preparation workflow using the N2 chip is illustrated in FIG. 10. To sort single cells in the miniaturized nanowells, we employed an image-based single-cell isolation system (IBSCI, cellenONE F1.4). The cellenONE system also dispensed low nanoliter reagents for cell lysis, protein reduction, akylation, and digestion. After protein digestion, TMT reagent was dispensed to label peptides in each nanowell uniquely. Finally, 10 ng boosting/carrier peptide and 0.5 ng reference peptide were distributed into each nanowell cluster to improve the protein identification rate (FIG. 11) (Budnik et al., *Genome Biol* 2018, 19:161). To integrate the N2 chip in a LC-MS workflow, the chip was loaded in a nanoPOTS autosampler (Williams et al., *Anal Chem* 2020, 92:10588-10596). A 3-μL droplet was applied on top of the nested nanowells, the TMT set was combined, and the peptide mixture extracted for LC-MS analysis (FIG. 10). Compared with the previous nanoPOTS-TMT workflow (Williams et al., *Anal Chem* 2020, 92:10588-10596; Tsai et al., *Mol Cell Proteomics* 2020, 19:828-838; Dou et al., *Anal Chem* 2019, 91:13119-1317), the total processing time of each chip was reduced from 36.5 min to 18 min, while the number of processed cells was increased from 44 cells to 243 cells, which is equivalent to the reduced time from 0.83 min to 0.07 min for each single cell. As such, the N2 chip increases the single-cell processing throughput by >10×. Advantageously, the N2 chip can be coupled with conventional LC systems without the use of the customized nanoPOTS autosampler. For example, the user can manually add an 8-μL droplet inside the hydrophilic ring to pool the TMT-labeled single-cell samples and transfer it into an autosampler vial for LC injection.

Example 2

Sensitivity and Reproducibility of the N2 Chip

The performance of the N2 chip was benchmarked against the previous nanowell chip using diluted peptide samples from three murine cell lines (C10, Raw, SVEC). To mimic the scProteomics sample preparation process, 0.1 ng of peptide was loaded in each nanowell of both N2 and nanowell chips (FIG. 11) and the chips were incubated at room temperature for 2 h. The long-time incubation allowed peptides to adsorb on nanowell surfaces and lead to differential sample recoveries. The combined TMT samples were analyzed by the same LC-MS system. When containing at least 1 valid reporter ion value was considered as an identified peptide, an average of 5,706 peptides were identified with N2 chip, compared with only 4,614 with the prior nanowell chip. The increased peptide identifications resulted in a 15% improvement in proteome coverage; the average proteome identification number was increased from 1,082±22 using nanowell chips to 1,246±6 using N2 chips (FIG. 12). Significant increases in protein intensities were observed with the N2 chip. The median log 2-transformed protein intensities were 13.21 and 11.49 for N2 and nanowell chips, respectively, corresponding to ~230% improvement in protein recovery (FIG. 13). Together, these results demonstrated that the N2 chips can improve sample recovery and proteomics sensitivity.

Figure 14:
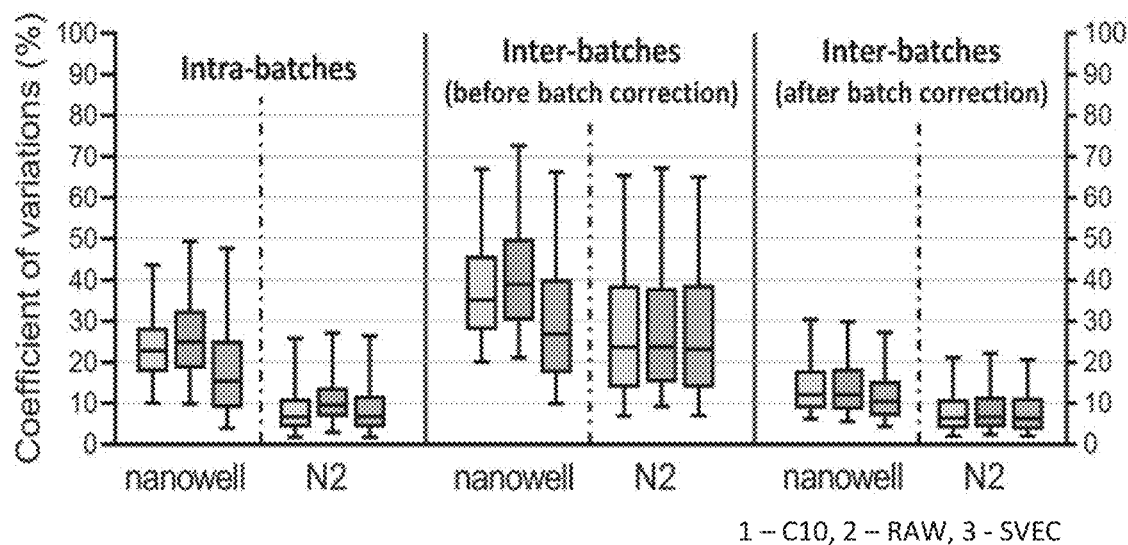
FIG. 14 shows the distributions of the coefficient of variations (CVs) for proteins identified in C10, RAW, and SVEC cells (left to right in each data set). Center lines show the medians; box limits indicate the 25th and 75th percentiles; whiskers extend 1.5 times the interquartile range from the 25th and 75th percentiles.

More proteins were quantifiable with N2 chip when 70% valid values in each cell line were required; the quantifiable protein numbers were 870 and 1,123 for nanowell and N2 chips, respectively; 842 proteins were identified with both chips, 28 proteins were identified only with the nanowell chip, and 281 proteins were identified only with the N2 chip. For the nanowell chips, pairwise analysis of any two samples showed Pearson's correlation coefficients from 0.97 to 0.99 between the same cell types and from 0.87 to 0.95 between different cell types. With the N2 chips, Pearson's correlation coefficients were increased to a range of 0.98-0.99 for the same cell types, and a range of 0.91-0.96 for different cell types. The quantification reproducibility was evaluated by measuring the coefficient of variations (CV) of samples from the same cell types. In intra-batch calculations, median protein CVs of <9.6% were obtained from N2 chips, which was more than two-fold lower than that from nanowell chips (median CVs of <24.9%) (FIG. 14). Protein CVs were calculated inside single TMT batches (left), among different TMT batches without batch corrections (middle), and with batch correction (right). From left to right, the number of proteins (n) are: 1005, 1002, 975, 1213, 1233, 1221, 745, 747, 759, 938, 927, 944, 736, 738, 747, 937, 924, and 940, respectively. Higher CVs were obtained between different TMT batches, which was known as TMT batch effect (Brenes et al., *Mol Cell Proteomics* 2019, 18:1967-1980). When Combat algorithm (Leek et al., *Bioinformatics* 2012, 28:882-883) was applied to remove the batch effect, the median protein CVs from N2 chip dropped to <6.7%. Such low CVs are comparable with bulk-scale TMT data, demonstrating the N2 chip provides high reproducibility for robust protein quantification in single cells.

Example 2

Proteome Coverage of Single Cells with the N2 Chip

Figure 15:
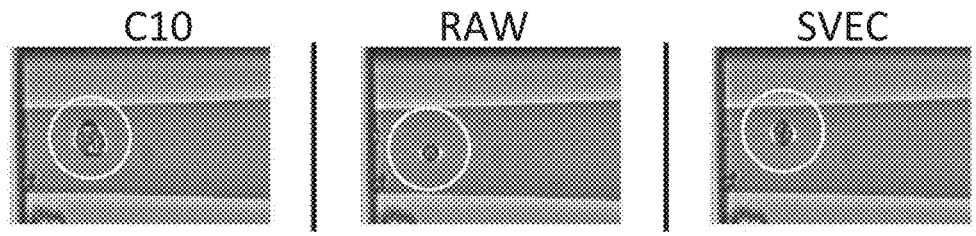
FIG. 15 shows representative images of single C10, Raw264.7, and SVEC cells.

A total of 108 single cells (12 TMT sets) from three murine cell lines were analyzed, including epithelial cells (C10), immune cells (Raw264.7), and endothelial cells (SVEC) (FIG. 11). These three cell types have different sizes, which allowed evaluation of whether the workflow presents a bias in protein identification or quantification based on cell sizes. Specifically, Raw cells have a diameter of 8 µm, SVEC of 15 µm and C10 of 20 µm (FIG. 15).

Figure 16A:
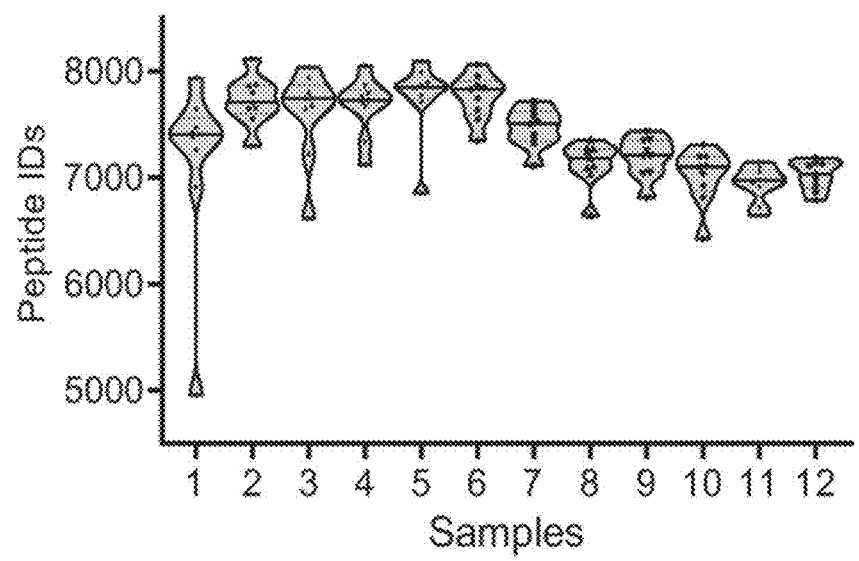
FIGS. 16A-16E are graphs showing the numbers of identified peptides (16A) and proteins (16B) in 12 TMT sets; the numbers of quantifiable proteins based on different percentages of required valid values (16C); a box plot showing the distributions of protein identification numbers (n=36 single cells for each cell type) (16D); violin plots showing the distribution of log 2 transformed protein intensities for the three cell types (n=20854 for C10; n=20020 for RAW; n=20884 for SVEC (16E). Center lines show the medians; top and bottom horizontal lines indicate the 25th and 75th percentiles, respectively.
Figure 16C:
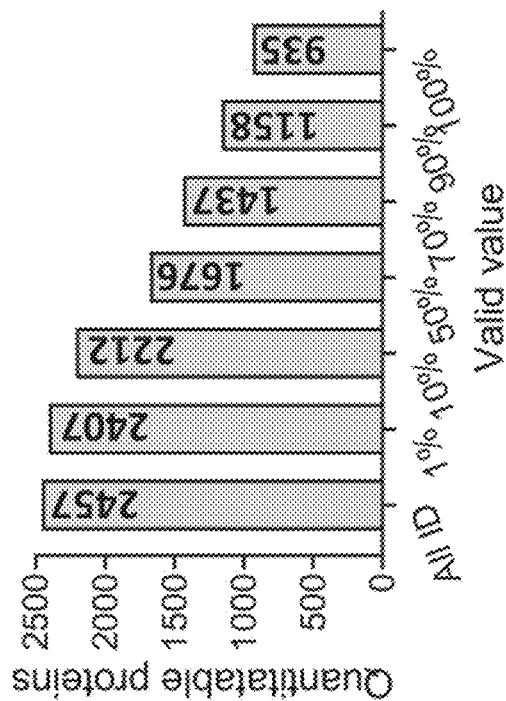
Figure 16E:
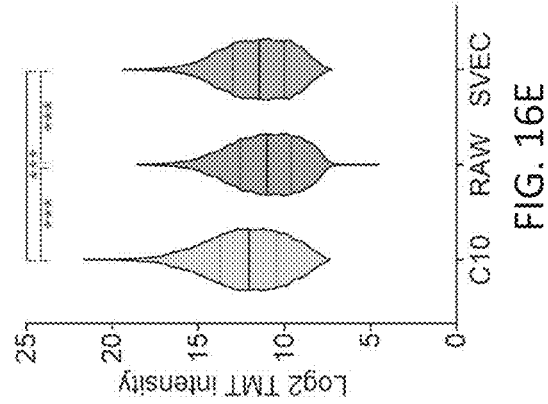
Figure 16B:
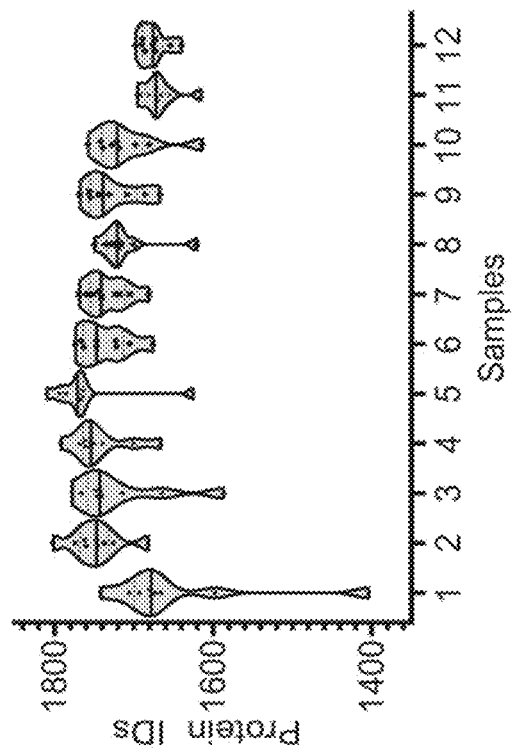

Among the 12 TMT sets, the N2 chip platform identified an average of ~7369 unique peptides and ~1716 proteins from each set with at least 1 valid value in the 9 single-cell channels (FIGS. 16A and 16B). At least 1 valid value in the 9 single-cell channels was required to count as an identification. Centerlines show the medians; top and bottom horizontal lines indicate the 25th and 75th percentiles, respectively. The data point (n) to generate the violin plots was 9.

Figure 16D:
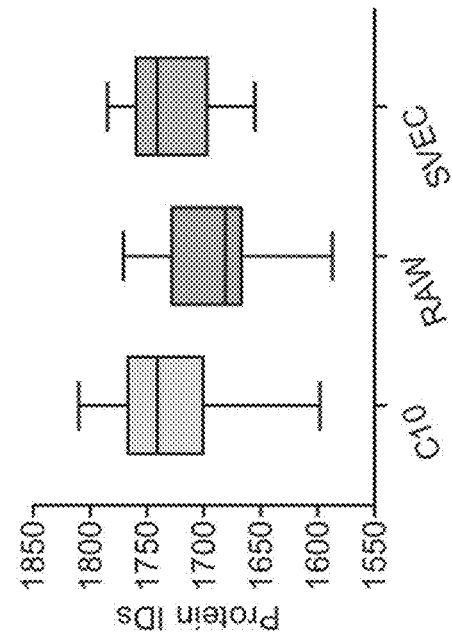

A total of 2457 proteins were identified, of which 2407 proteins had reporter ion intensities in at least 1 single cells across the 108 cells (FIG. 16C). When a stringent criteria of >70% valid values was applied, the number of proteins dropped to 1437. As expected, the numbers of proteins identified for three cell types ranked according to the cell sizes (FIG. 15). An average of 1735, 1690, and 1725 proteins were identified in C10, RAW, and SVEC cells, respectively (FIG. 16D). Centerlines show the medians; box limits indicate the 25th and 75th percentiles; whiskers extend 1.5 times the interquartile range from the 25th and 75th percentiles. Similar trends were also observed in the distribution of protein intensities (FIG. 16E). A two-sided t-test was applied to confirm the significance between different cell types (p-value***<0.001).

The software SCPCompanion is used to characterize the quality of the data generated from single-cell proteomics experiments employing isobaric stable isotope labels and a carrier proteome (Cheung et al., *Nat Methods* 2021, 18:76-83). SCPCompanion extracts signal-to-noise ratio (SNR) of single-cell channels and provides suggested cutoff values to filter out low-quality spectra to obtain high-quality protein quantitation. In line with the experimental design, SCPCompanion estimated that ~0.1 ng proteins were contained in single cells, and the boost-to-single ratio was ~100, indicating minimal peptide losses in the N2 chip. More importantly, the median SNR per single-cell sample was 14.4, which is very close to the suggested cutoff value of 15.5, corresponding to ~50% of raw MS/MS spectra can provide robust quantification. The data quality was also compared with data generated with previous nanowell chips and a similar LC-MS setup (Tsai et al., *Mol Cell Proteomics* 2020, 19:828-838; Dou et al., *Anal Chem* 2019, 91:13119-13127). The median SNR values per sample were 7.0 (Tsai et al.) and 6.4 (Dou et al.), indicating the N2 chip-based workflow increased the SNRs by 106% and 125%, respectively (FIG. 17). Centerlines show the medians; top and bottom horizontal lines indicate the 25th and 75th percentiles, respectively. The numbers (n) of SNR datapoints are 284,193 in N2 datasets, 282,190 in Tsai et al. datasets, and 260,039 in Dou et al. datasets.

To verify the performance improvement observed in the N2 chips was not solely due to the change of TMT reagents from TMT 10plex™ to TMTpro™ 16plex-labeled peptides (ThermoFisher Scientific. Waltham, MA), single-cell-level peptides (0.1 ng) were labeled with both TMT 10plex™ and TMTpro™ 16plex labels and analyzed with the same MS using four different normalized HCD collision energy levels. As shown in FIG. 18A, MS1 peak intensities show similar distribution between the two TMT reagents. Centerline shows the median; box limits indicate the 25th and 75th percentiles; whiskers extend 1.5 times the interquartile range from the 25th and 75th percentiles. At MS2 level, TMTpro™ 16plex labels consistently gave higher signal intensities (FIG. 18B) and SNRs (FIG. 18C). The differences were much larger at lower HCD energy compared with high energy levels. The SNRs were increased by 212%, 119%, 67%, and 66% at HCD energies of 26%, 29%, 32%, and 35%, respectively. Because similar normalized HCD collision energies were used in the current N2 chip (34%) and previous nanowell chip-based work (35%), it was reasoned that the TMTpro™ 16plex reagent could lead to a similar improvement of ~66%, which accounts for ~40-50% of the total contributions.

Example 3

LC-MS/MS and Data Analysis

Figure 19:
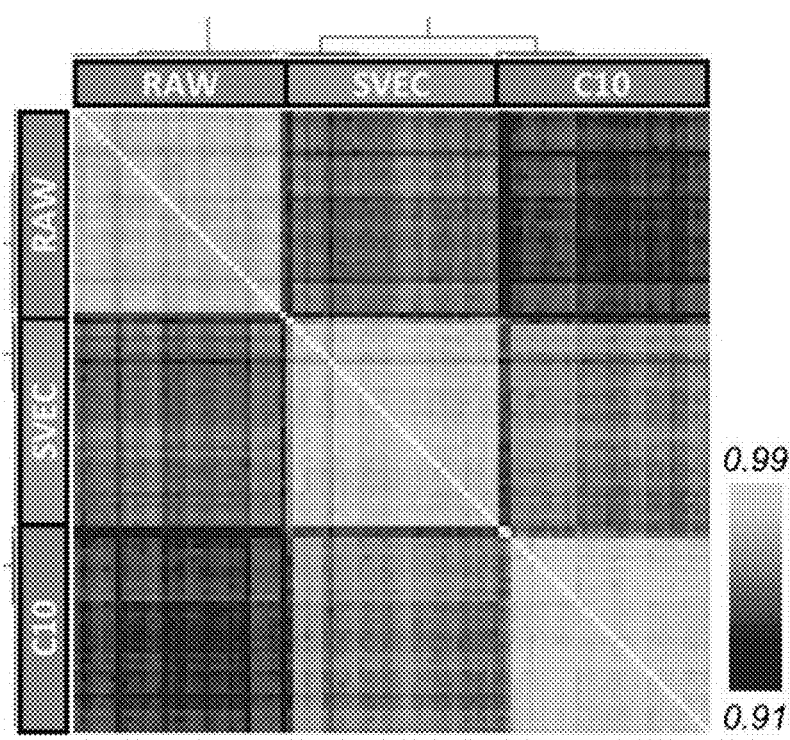
FIG. 19 is a clustering matrix showing Pearson correlations across 108 single cells using log 2-transformed protein intensities; the color scale indicates the range of Pearson correlation coefficients.

To assess the quantitative performance of the N2 chip-based scProteomics platform, a pairwise correlation analysis was performed using the 1437 proteins across the 108 single cells. As expected, higher correlations were observed among the same types of cells and lower correlations among different types of cells (FIG. 19). The median Pearson correlation coefficients are 0.98, 0.97, and 0.97 for C10, RAW, and SVEC cells, respectively. The coefficient of variations (CVs) were calculated using protein abundances for the three cell populations. Interestingly, very low variations were seen with median CVs<16.3% (FIG. 20), indicating protein expression is very stable for cultured cells under identical conditions. For each cell type, 36 single cells from 12 TMT sets were used for the calculation.

Principal component analysis (PCA) showed strong clustering of single cells based on cell types and the three clusters were well separated from one another (FIG. 21A). A total of 1,437 proteins were used in the PCA projection. These results were compared to a previous PCA result obtained from the same three cell types using the nanowell-based platform (FIG. 21B; Dou et al., *Anal Chem* 2019, 91:13119-13127). A total of 1,032 proteins were used.

Figure 22:
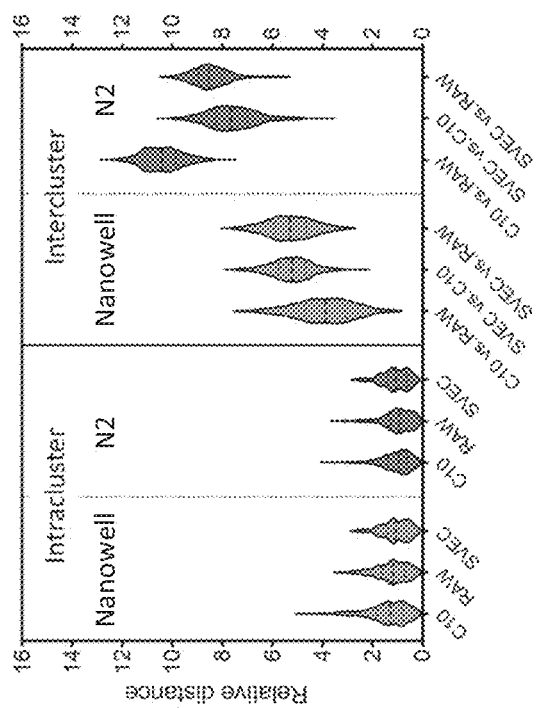
FIG. 22 is a cluster distance analysis for PCA clusters prepared using the prior nanowell device or the disclosed device (N2). Center lines show the medians; top and bottom horizontal lines indicate the 25th and 75th percentiles, respectively.

The median intra-cluster distances for the two-component PCA were relatively similar at 1.16 and 0.92 (median values) for nanowell and N2 chips, respectively (FIG. 22). Conversely, the inter-cluster distances were 4.93 and 8.68 for nanowell and N2 chips, demonstrating the data generated from N2 chips have higher classification power for different cell populations. Intracluster distance is the distance between two objects belonging to same cluster, while intercluster distance is the distance between two objects belonging to two different clusters. In the intracluster plot, the numbers of distance values (n) from nanowell and N2 datasets are 276 and 630, respectively; In the intercluster plot, the number of the distance values (n) from nanowell and N2 datasets are 576 and 1296, respectively.

Figure 23:
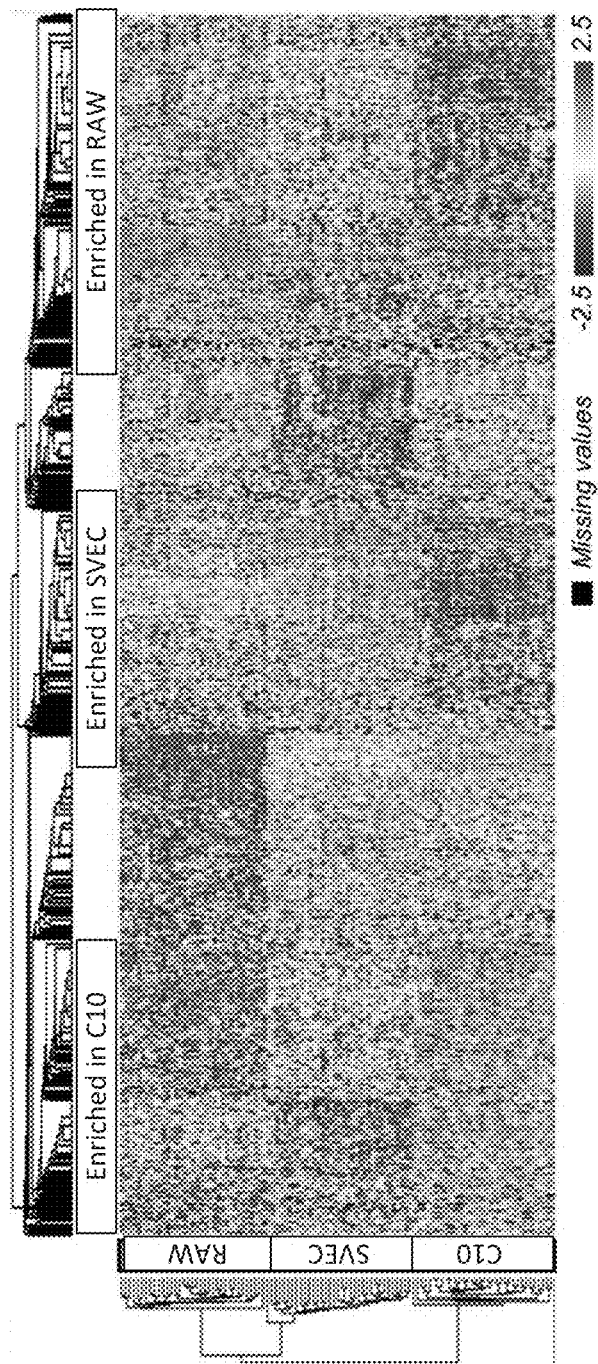
FIG. 23 is a heatmap with hierarchical clustering showing 1,127 significant proteins based on ANOVA test. Three protein clusters used for pathway analysis were labeled and highlighted. The color scale indicates the range of Z-score values.
Figure 24:
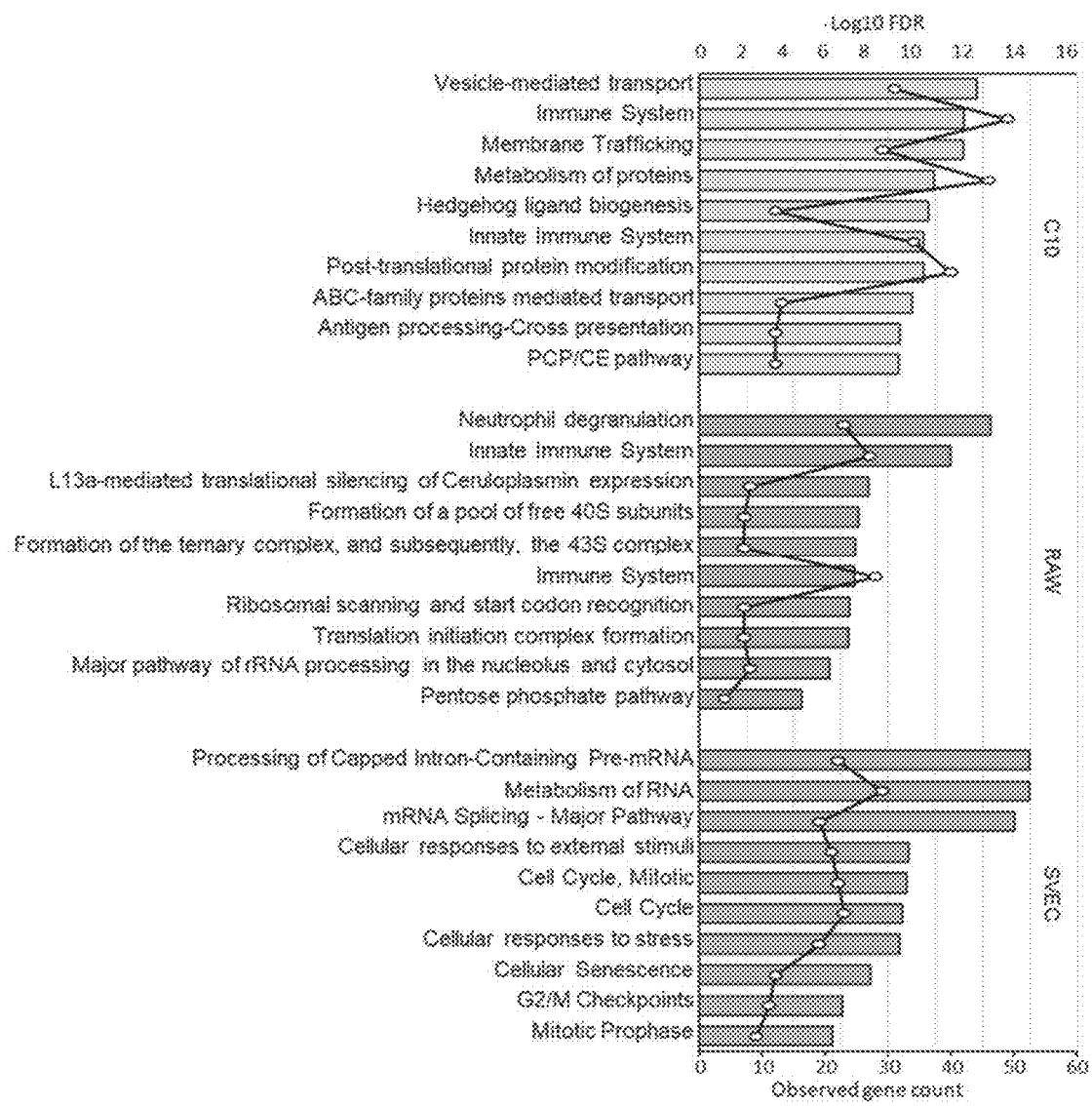
FIG. 24 is a REACTOME pathway analysis of enriched proteins in each cell type by hierarchical clustering analysis.

To identify proteins leading the clustering of the three cell populations, an ANOVA test was performed (Permutation-based FDR<0.05, S0=1). Of the total 1437 proteins, 1127 were significantly differentially changed in abundances across three cell types (FIG. 23). Among them, 237 proteins were enriched in C10 cells, 203 proteins were enriched in SVEC cells, and 275 proteins were enriched in RAW cells. Proteins enriched in each cell type revealed differences in molecular pathways based on the REACTOME pathway (an open-source, curated and peer-reviewed pathway database) analysis (FIG. 24). For example, the proteins higher in abundance in C10 cells were significantly enriched in REACTOME terms such as "vesicle-mediated transport", "membrane trafficking", "Innate immune system", or "antigen processing-cross presentation". These functions are in line with the known functions of lung epithelial cells, from which the C10 cells are derived (Waters et al., *Compr Physiol* 2012, 2:1-29). The proteins more abundant in RAW cells, which derive from murine bone marrow macrophages, were enriched in REACTOME terms associated with "neutrophil degranulation", "Innate immune system" in line with their immune function. Other REACTOME terms related to the "ribosome" and the "pentose phosphate pathway" were also enriched. These pathways not only suggest that there is intricate cooperation between macrophages and neutrophils to orchestrate resolution of inflammation and immune system (Yang et al., *Nat Commun* 2019, 10:1076), but also show that system metabolism strongly interconnects with macrophage phenotype and function (Baardman et al., *Cell Rep* 2018, 25:2044-2052 e2045). Proteins more abundant in SVEC cells (murine endothelial cells) were enriched in pathways, including "processing pre-mRNA", "cell cycle", or "G2/m checkpoints". This suggests proliferation, migration, or coalescing of the endothelial cells to form primitive vascular labyrinths during angiogenesis (Wang et al., PNAS USA 2008, 105:7738-7743).

Example 4

Identifying Cell Surface Markers with scProteomics

One of the unique advantages of scProteomics over single-cell transcriptomics is the capability to identify cell surface protein markers, which can be readily used to enrich selected cell populations for deep functional annotations. An evaluation was performed to determine whether scProteomics data could be used to identify cell-type-specific membrane surface proteins for the three cell populations. The enriched protein lists were matched to a subcellular-localization database from UniProtKB, which consists of 2,871 reviewed plasma membrane proteins for *Mus musculus* (updated on 01/04/2021). A list containing 64 plasma membrane proteins was generated. Among them, 17 proteins were highly expressed in C10 compared to RAW and SVEC cells, while 34 and 13 plasma membrane proteins were significantly enriched in RAW and SVEC cells, respectively.

Figure 25:
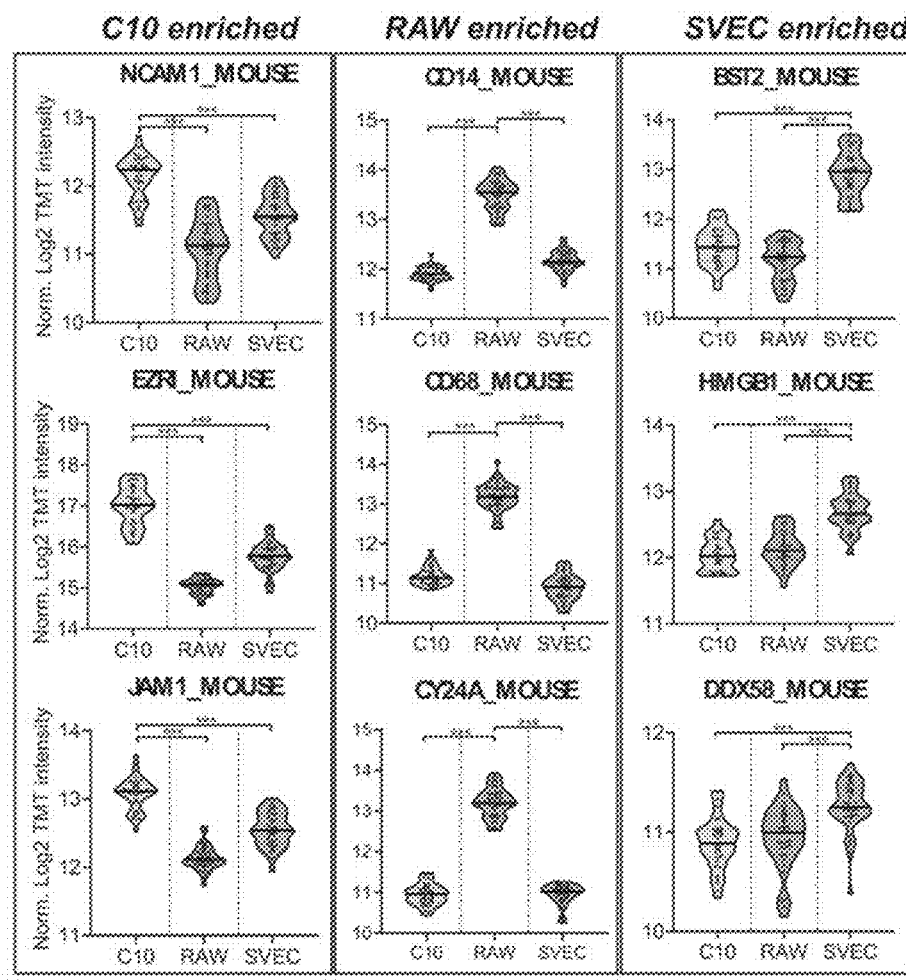
FIG. 25 is a series of violin plots showing nine putative plasma membrane proteins enriched in three cell types.

FIG. 25 is a series of violin plots showing nine putative plasma membrane proteins enriched in the three cell types. Proteins in each column are statistically significant (Two-sided t-test, p-value***<0.001) expressed in the specific cell type. Centerlines show the medians; top and bottom horizontal lines indicate the 25th and 75th percentiles, respectively. For C10, n=34 single cells; For RAW, n=35 single cells; For SVEC, n=35 SVEC single cells. For example, NCAM1, EZR1, and JAM1, which are previously known to protect the barrier function of respiratory epithelial cells by enhancing the cell-cell adhesion, are highly expressed in C10 cells (FIG. 25, left panel). For RAW enriched membrane proteins, CD14 and CD68 are widely used as histochemical or cytochemical markers for inflammation-related macrophages (FIG. 25, middle panel). CY24A is a subcomponent of the superoxide generating NOX2 enzyme on macrophage membrane. In terms of SEVC enriched protein markers, BST2 is known to be highly expressed in blood vessels throughout the body as an intrinsic immunity factor (FIG. 25, right panel). Both of HMGB1 and DDX58 were found to be highly expressed in endothelial cells in lymph node tissue based on tissue microarray (TMA) results in human protein atlas. An attempt was made to compare with our previous results using nanowell chips. Only 5 out of the 9 membrane proteins were significantly enriched in one of the cell types, and 3 were not detected, likely due to the lower sensitivity and reproducibility of the previous nanowell devices and workflows.

Figure 26:
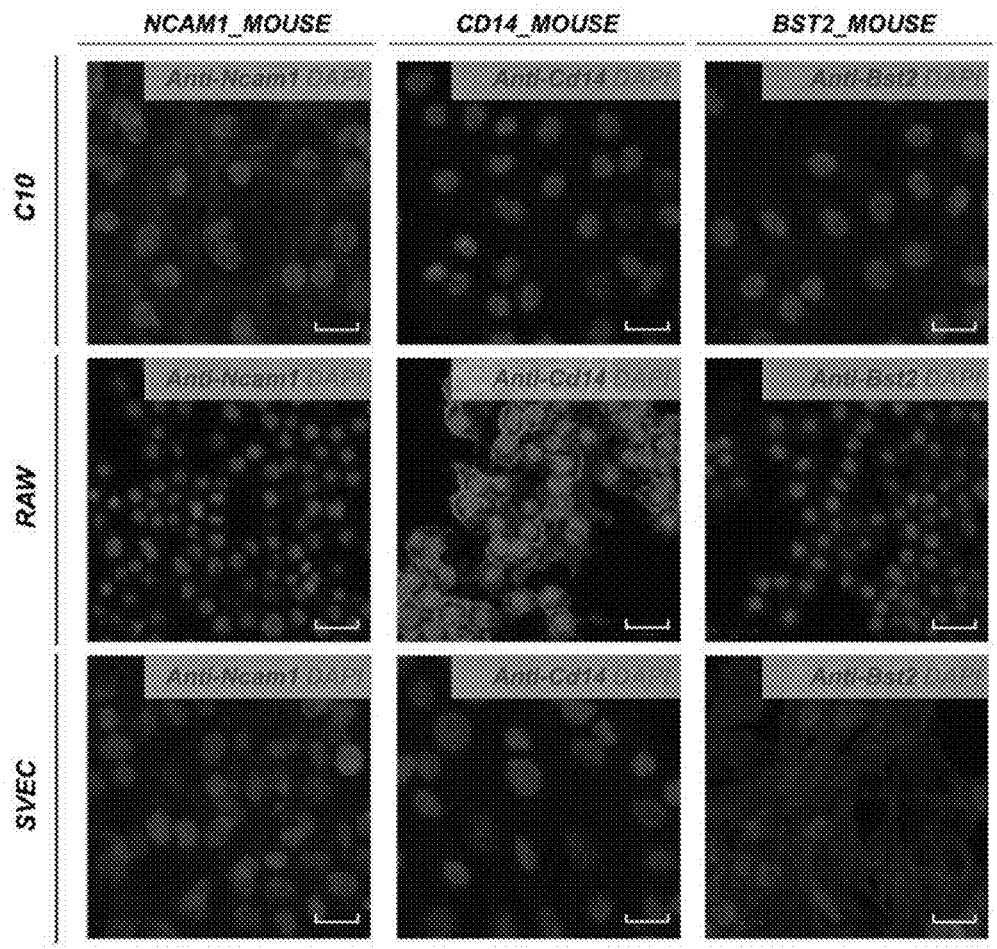
FIG. 26 shows immunofluorescence images showing the expression of NCAM1_MOUSE, CD14_MOUSE, and BST2_MOUSE in three cell types. The protein abundance is visualized with red fluorescence, and DNA is visualized by DAPI staining (blue). The length of scale bar is 20 μm.

To evaluate the usability of scProteomics for identifying the cell-type-specific surface marker proteins, one protein was selected from each of the three cell populations (NCAM1_MOUSE for C10; CD14_MOUSE for RAW; BST2_MOUSE for SVEC) and their specificity was evaluated using an immunofluorescence imaging approach. As shown in FIG. 26, immunofluorescence imaging validated the enrichments of the three marker proteins to their assigned cell types. It also confirmed their expected subcellular localization at the surface of the plasma membrane. Next, these protein markers were assessed to determine whether they are specifically expressed in similar cell types in tissue samples. The localization of the markers was verified on human immunoperoxidase histology images generated by the Human Protein Atlas focusing on respiratory organs (lung, bronchi, and nasopharynx). While the general organization of the lung differs in human and mice (e.g. number of lobes, airway, and bronchi organization), the cell types composing the organ are almost identical as evidenced in a scRNA-seq study (Bhattacharya et al., *bioRxiv* 2020, https://doi.org/10.1101/2020.06.16.156042). As anticipated, the localization of the protein markers for similar cell types in human tissues was in agreement with the scProteomics data (e.g., C10 and RAW). Both EZR1 and JAM1 enriched in C10 were localized in human epithelial cells. The immune-cell-related markers, CD14, CD68, and CYBA (Uniprot protein name: CY24A_Human), were localized explicitly in macrophage cells in human lung tissues. Together, these results demonstrated cell-type-specific surface markers can be effectively identified by combining scProteomics with subcellular-localization information.

Example 5

Comparing scProteomics with scRNA-Seq Measurements

Figure 27A:
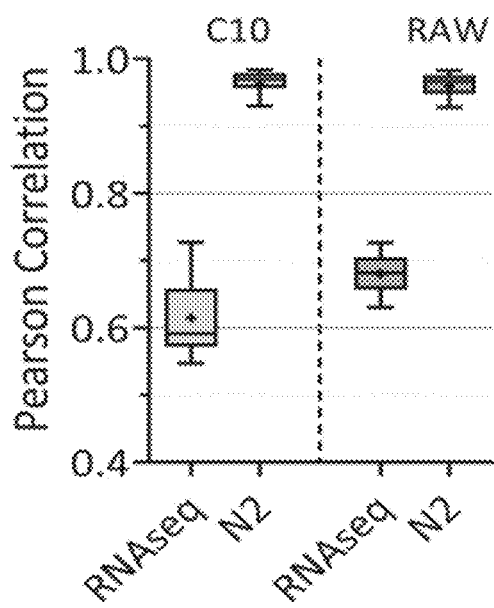
FIGS. 27A and 27B are box plots showing the distributions of Pearson correlation coefficients (27A) and coefficient of variations (27B) of transcript and protein abundances from scRNA-seq (Pearson correlation plot: n=11 single C10 cells and 186 single RAW cells; coefficient of variation plot: n=1292 genes for both C10 and RAW) and scProteomics (Pearson correlation plot: n=36 single cells for both C10 and RAW; coefficient of variation plot: n=1292 proteins for both C10 and RAW cells), respectively. Centerlines show the medians; box limits indicate the 25th and 75th percentiles; whiskers extend 1.5 times the interquartile range from the 25th and 75th percentiles.
Figure 27B:
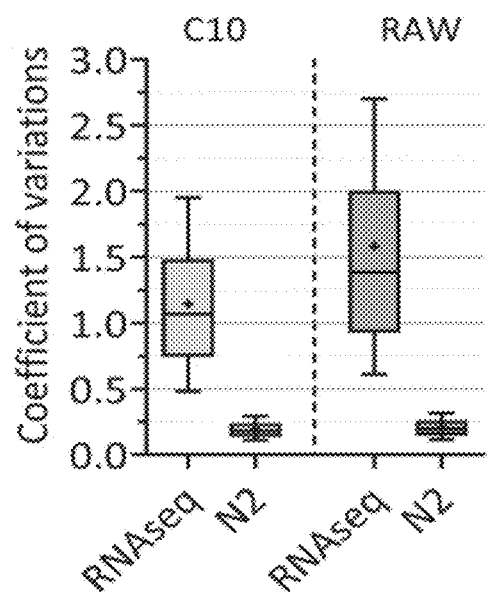
Figure 28A:
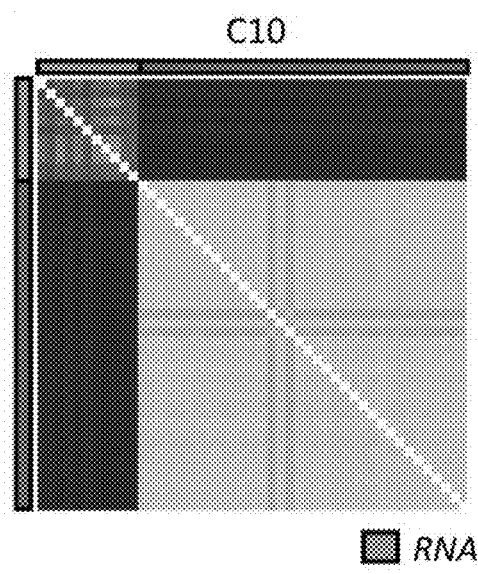
FIGS. 28A and 28B are clustering matrices showing Pearson correlations of transcript and protein abundances for C10 (28A) and RAW cells (28B). The color scale indicates the range of Pearson correlation coefficients.
Figure 28B:
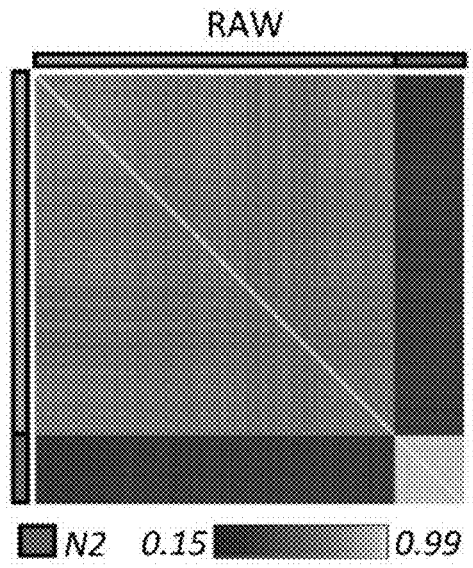

The scProteomics results obtained from cells prepared with the N2 chip were compared to previously published scRNA-seq datasets containing 11 C10 cells (Mitchell et al., *ACS Nano* 2016, 10:10173-10184) and 185 Raw cells (Lane et al., *Cell Syst* 2017, 4:458-469 e455) generated with SMART-Seq2 workflows. Compared with scRNA-seq, higher Pearson correlation coefficients from scProteomics were observed for both cell types (FIG. 27A). Specifically, the medians of correlation coefficients of mRNA abundances are 0.60 (C10) and 0.71 (RAW), while the coefficients of protein abundances are significantly increased to 0.98 (C10) and 0.97 (RAW). The low variation in protein abundances can also be observed in the CV distributions of protein or mRNA abundances (FIG. 27B). Previous work has suggested moderate correlations between protein and mRNA abundances of the same genes (Darmanis et al., *Cell Rep* 2016, 14:380-389; Brunner et al., *bioRxiv* 2021, https://doi.org/10.1101/2020.12.22.423933). The cross-correlation analysis between protein and mRNA showed similar trends with coefficients of 0.22 for C10 and 0.36 for RAW (FIGS. 28A and 28B). These low correlations agree with bulk-scale measurement and suggest scProteomics could provide additional information on the cell functions.

Figure 29:
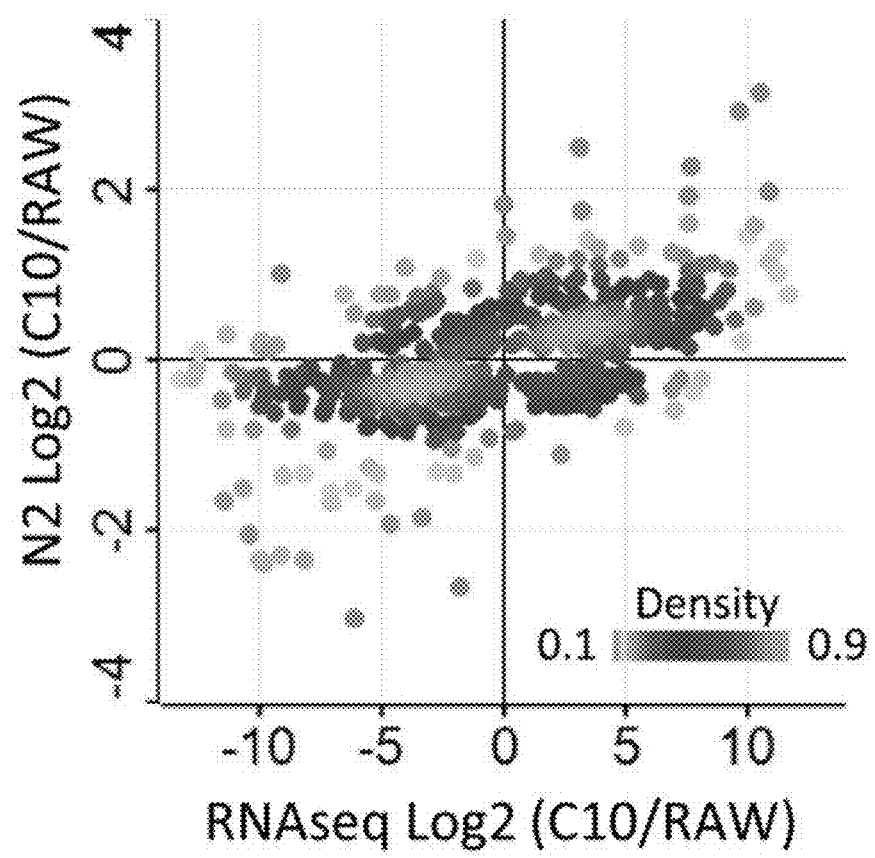
FIG. 29 shows the linear correlation of log 2-transformed fold changes of C10 and RAW cells between scRNA-seq and scProteomics. The color scale indicates the range of data point density.
Figure 30:
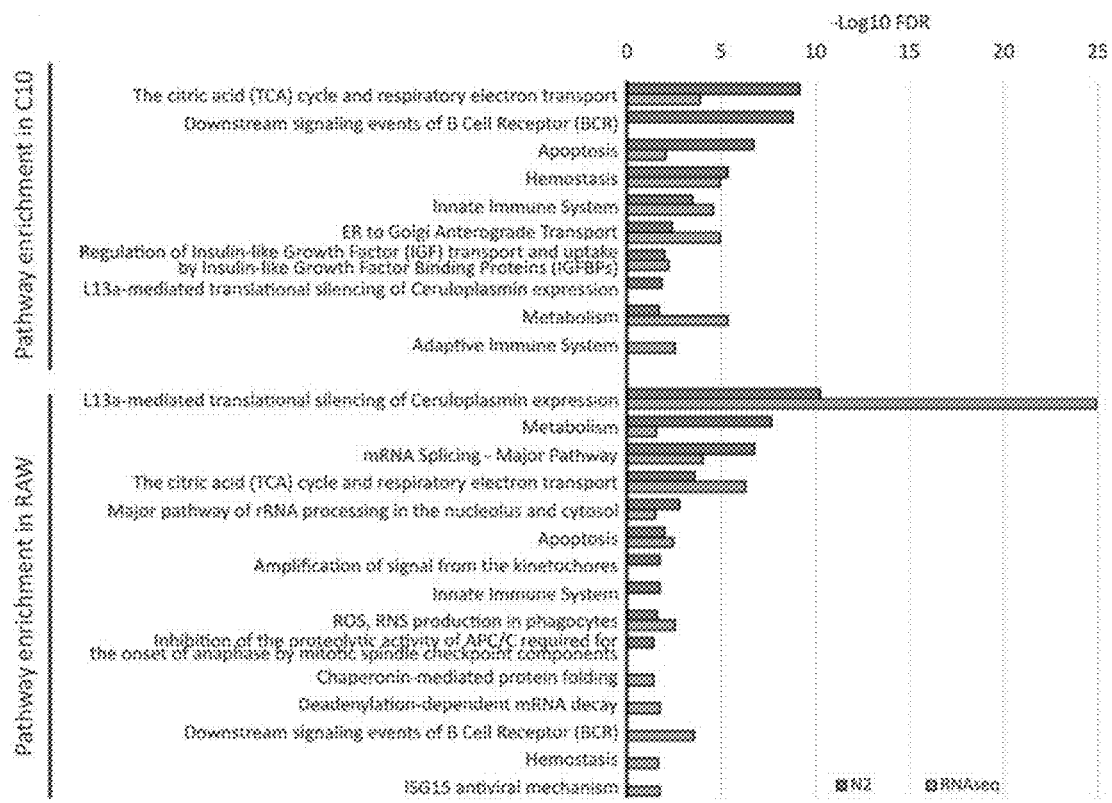
FIG. 30 is a REACTOME pathway analysis of enriched mRNA and proteins in the C10 and RAW cells. A two-sided t-test with p-value of <0.05 was used to generate the significantly enriched targets.

To identify the differentially expressed proteins and mRNA between the two cell types, T-tests were performed for both datasets. The protein and mRNA enriched either in C10 or RAW were moderately correlated. The overlaps between enriched mRNA and proteins were 44% for C10 and 40% for RAW cells. Most proteins and mRNA followed a similar abundance pattern between the two cell types (FIG. 29). The linear correlation coefficient of the log 2 (fold-changes) of the protein-mRNA pair was 0.55. The magnitude of the fold-change was higher for mRNA compared to protein (linear regression slope 0.08). This difference may indicate that a high amount of RNA is required to result in a moderate change of protein abundance. Another explanation is that the amplification steps employed in single-cell RNA sequencing may result in artificially inflated fold-changes. REACTOME pathway analysis for the significantly enriched proteins and mRNAs indicated general agreements between the two measurement types (FIG. 30). However, a few enriched pathways were unique to either single-cell proteomics or RNA sequencing. For example, for pathways enriched in C10 cells, downstream signaling events of B cell receptor (BCR) was only detected at protein level and the adaptive immune system was only seen at mRNA level. For pathways enriched in RAW cells, the innate immune system was only observed at the protein level. However, several immune-related REACTOME pathway terms were unique at mRNA level.

Figure 31:
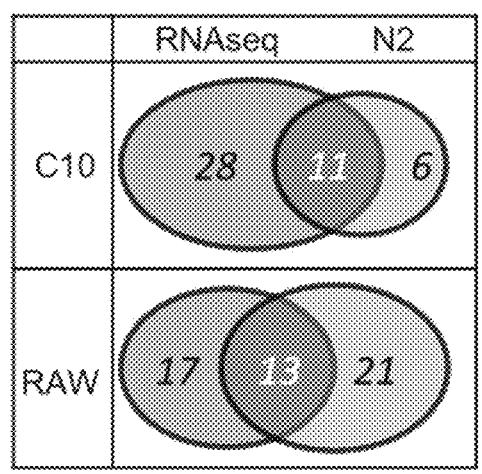
FIG. 31 is a Venn diagram showing the overlap of membrane protein markers predicted by RNA seq and proteomics.

Finally, an evaluation was performed to determine whether mRNA and protein measurements predict the same membrane protein markers. After matching to the same subcellular-localization database, scRNA-seq measurements identified 30 membrane proteins for RAW cells and 40 proteins for C10 cells. The overlaps between the two measurements were moderate for both cell types (FIG. 31). Less than 32.5% protein targets predicted by RNA-seq were found by proteomics measurements, indicating mRNA abundances cannot precisely infer membrane protein abundances. Interestingly, both protein and mRNA measurements identified the six proteins shown in FIG. 25 as significantly enriched markers. Overall, the analysis suggests the combination of the two modalities provides the most reliable membrane protein markers.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A device, comprising:
 a substrate having an upper surface;
 a plurality of spaced apart arrays disposed on the upper surface of the substrate, the arrays comprising a plurality of reaction vessels positioned on, or embedded within, the upper surface of the substrate, wherein the reaction vessels have a hydrophilic surface and a diameter from greater than 0 mm to 0.8 mm; and
 a hydrophilic ring surrounding each array, the hydrophilic ring positioned on, or embedded within, the upper surface of the substrate, wherein unoccupied regions of the upper surface of the substrate, including unoccupied regions located between reaction vessels within each array and unoccupied regions located between adjacent arrays, are hydrophobic.

2. The device of claim 1, wherein the reaction vessels have a volume no greater than 100 nL.

3. The device of claim 1, wherein the arrays comprise from 3 to 100 reaction vessels configured in a grid pattern.

4. The device of claim 1, wherein:
 (i) the plurality of arrays comprises from 2 to 100 spaced apart arrays; or
 (ii) the plurality of arrays comprises at least one row of spaced apart arrays; or
 (iii) both (i) and (ii).

5. The device of claim 1, wherein:
 (i) the arrays are positioned on the upper surface of the substrate and the reaction vessels have an upper surface at a height of from 0 µm to 10 µm above the upper surface of the substrate; or
 (ii) the hydrophilic rings are positioned on the upper surface of the substrate and have an upper surface at a height of from 0 µm to 10 µm above the upper surface of the substrate; or
 (iii) both (i) and (ii).

6. The device of claim 1, wherein:
 (i) the arrays are embedded within the upper surface of the substrate and the reaction vessels have a non-zero depth from greater than 0 µm to 200 µm; or
 (ii) the hydrophilic rings are embedded within the upper surface of the substrate and have a non-zero depth from greater than 0 µm to 200 µm; or
 (iii) both (i) and (ii).

7. The device of claim 1, wherein:
 (i) the reaction vessels within the arrays are spaced from 0.2 mm to 1.0 mm apart, center-to-center, from adjacent reaction vessels; or
 (ii) adjacent spaced apart arrays have a center-to-center array spacing of from 2.5 mm to 20 mm; or
 (iii) both (i) and (ii).

8. The device of claim 1, wherein the reaction vessels within a single array are oriented in a square grid, a rectangular grid, or a circle.

9. The device of claim 1, wherein the substrate comprises glass, polydimethylsiloxane (PDMS), polytetrafluoroethylene (PTFE), or polypropylene (PP).

10. The device of claim 1, wherein:
 (i) the device comprises a hydrophobic coating on the unoccupied regions; or
 (ii) surfaces of the reaction vessels and hydrophilic rings comprise a passivation coating; or
 (iii) both (i) and (ii).

11. The device of claim 10, wherein:
 (i) the hydrophobic coating comprises heptadecafluoro-1,1,2,2-tetrahydrodecyl-dimethylchlorosilane (PFDS), 1H, 1H,2H,2H-perfluorooctyl triethoxysilane (FOTS), or trichloro(octadecyl)silane (OTS); or
 (ii) the passivation coating comprises polyethylene glycol, dextran, dichlorodimethylsilane, or dichlorodiethylsilane; or
 (iii) both (i) and (ii).

12. A method of making a device according to claim 1, the method comprising:
 providing a substrate having an upper surface with anti-reflective material layer and a photoresist material layer disposed on the upper surface;

selectively removing portions of the photoresist material layer and the anti-reflective material layer to provide exposed regions and unexposed regions;

treating the upper surface of the substrate with a hydrophobic reagent to form a hydrophobic coating on surfaces of the exposed regions; and forming one or more arrays, each array comprising a plurality of reactions vessels, and a ring surrounding each array by removing remaining photoresist material layer and anti-reflect material layer from the unexposed regions to provide newly exposed regions of the upper surface of the substrate, the newly exposed regions defining the one or more arrays and the ring surrounding each array, wherein the newly exposed regions are hydrophilic.

13. The method of claim 12, further comprising etching the exposed regions to remove a portion of the substrate in the exposed regions to a depth of up to 10 μm.

14. The method of claim 12, wherein treating the upper surface of the substrate with the hydrophobic reagent comprises:
drying the device;
exposing the device to oxygen plasma;
applying a solution comprising the hydrophobic reagent to the upper surface of the substrate; and
incubating the device for an effective period of time to form the hydrophobic coating on the surfaces of the exposed regions.

15. The method of claim 12, further comprising applying a passivation coating to surfaces of the reaction vessels and rings.

16. A method of making a device according to claim 1, the method comprising:
providing a substrate having an upper surface with an anti-reflective material layer and a photoresist material layer disposed on the upper surface;
selectively removing portions of the photoresist material layer and the anti-reflective layer to provide exposed regions and unexposed regions;
etching the exposed regions to remove a portion of the substrate in the exposed regions to provide etched exposed regions having a depth of up to 200 μm, wherein the etched exposed regions define one or more arrays, each array comprising a plurality of reaction vessels, and a ring surrounding each array;
removing the photoresist material layer and the anti-reflective material layer from the unexposed regions;
treating the upper surface of the substrate with a hydrophobic reagent to provide a hydrophobic coating on the upper surface;
masking the upper surface such that the etched exposed regions remain unmasked; and
removing the hydrophobic coating from the etched exposed regions.

17. A method of using a device, the method comprising:
providing a device according to claim 1;
transferring a volume of a sample to a reaction vessel in an array of the device, wherein the volume is a non-zero amount ≤100 nL;
processing the sample in the reaction vessel;
adding a volume of a composition comprising one or more isobaric tags to the reaction vessel;
dispensing an aqueous droplet onto the array, the aqueous droplet having a sufficient volume to cover a surface area of the array, whereby the aqueous droplet, fluid contents of the reaction vessel, and any fluid contents of other reaction vessels in the array are combined to form a mixture; and
collecting the mixture for subsequent analysis.

18. The method of claim 17, wherein the one or more isobaric tags comprises a selection of tandem mass tags.

19. The method of claim 17, wherein the sample is a biological sample and processing the sample comprises lysis, extraction, reduction, alkylation, digestion, chemical labeling, acidification, or any combination thereof.

20. The method of claim 19, wherein the subsequent analysis comprises analyzing the mixture to quantify one or more proteins in the biological sample.

21. The device of claim 1, wherein the hydrophilic ring defines a pooling region configured to collect fluid from two or more of the reaction vessels within each array.

* * * * *